(12) United States Patent
Mielke et al.

(10) Patent No.: US 12,644,973 B2
(45) Date of Patent: Jun. 2, 2026

(54) REFLECTIVE MATERIAL AND MARKERS FOR LIGHT SOURCE CALIBRATION

(71) Applicant: Luminar Technologies, Inc., Orlando, FL (US)

(72) Inventors: Stephen L. Mielke, Oviedo, FL (US); Julio Cesar Castaneda, Winter Park, FL (US); Aseem D. Patil, Orlando, FL (US); Christopher Gary Sentelle, Orlando, FL (US)

(73) Assignee: Microvision, Inc., Redmond, WA (US)

( * ) Notice: Subject to any disclaimer, the term of this patent is extended or adjusted under 35 U.S.C. 154(b) by 833 days.

(21) Appl. No.: 17/993,372

(22) Filed: Nov. 23, 2022

(65) Prior Publication Data

US 2024/0168142 A1 May 23, 2024

(51) Int. Cl.
*G01S 7/497* (2006.01)
*G01S 7/481* (2006.01)
*G01S 17/42* (2006.01)
*G01S 17/89* (2020.01)
*G01S 17/931* (2020.01)

(52) U.S. Cl.
CPC ............ *G01S 7/497* (2013.01); *G01S 7/4817* (2013.01); *G01S 7/4972* (2013.01); *G01S 17/42* (2013.01); *G01S 17/89* (2013.01); *G01S 17/931* (2020.01)

(58) Field of Classification Search
CPC .............................. G01S 7/497; G01S 7/4972
See application file for complete search history.

(56) References Cited

U.S. PATENT DOCUMENTS

| | | | |
|---|---|---|---|
| 2016/0124089 A1* | 5/2016 | Meinherz | G01S 17/894 |
| | | | 356/5.01 |
| 2020/0225349 A1* | 7/2020 | Hayashi | G01S 7/497 |

FOREIGN PATENT DOCUMENTS

| | | | | | |
|---|---|---|---|---|---|
| AT | 513402 | B1 | * | 9/2014 | G01S 17/10 |
| DE | 102018201688 | A1 | * | 8/2019 | G01S 7/4972 |
| EP | 1195617 | A1 | * | 4/2002 | G01S 7/4813 |
| JP | 2016031236 | A | * | 3/2016 | G01S 7/4972 |

* cited by examiner

*Primary Examiner* — Michael A Lyons
(74) *Attorney, Agent, or Firm* — Kevin D. Wills

(57) ABSTRACT

A system comprises a light source, a scanner, a reference reflectivity material, a detector, and a processor. The light source is configured to emit light, and the scanner is configured to scan the emitted light across at least a portion of a reachable region including a field of regard through a window. The reference reflectivity material is included internally within a housing of the system and located in the reachable region but outside the field of regard. The detector is configured to detect at least a portion of the emitted light scattered by the reference reflectivity material. The processor is configured to analyze detected information from the detector to determine an electrical property of the emitted light.

20 Claims, 14 Drawing Sheets

REFLECTIVE MATERIAL AND MARKERS FOR LIGHT SOURCE CALIBRATION

BACKGROUND OF THE INVENTION

Light detection and ranging (lidar) is a technology that can be used to measure distances to remote targets. Typically, a lidar system includes a light source and an optical receiver. The light source can include, for example, a laser which emits light having a particular operating wavelength. The operating wavelength of a lidar system may lie, for example, in the infrared, visible, or ultraviolet portions of the electromagnetic spectrum. The light source emits light toward a target which scatters the light, and some of the scattered light is received back at the receiver. The system determines the distance to the target based on one or more characteristics associated with the received light. For example, the lidar system may determine the distance to the target based on the time of flight for a pulse of light emitted by the light source to travel to the target and back to the lidar system.

BRIEF DESCRIPTION OF THE DRAWINGS

Various embodiments of the invention are disclosed in the following detailed description and the accompanying drawings.

DETAILED DESCRIPTION

Figure 1:
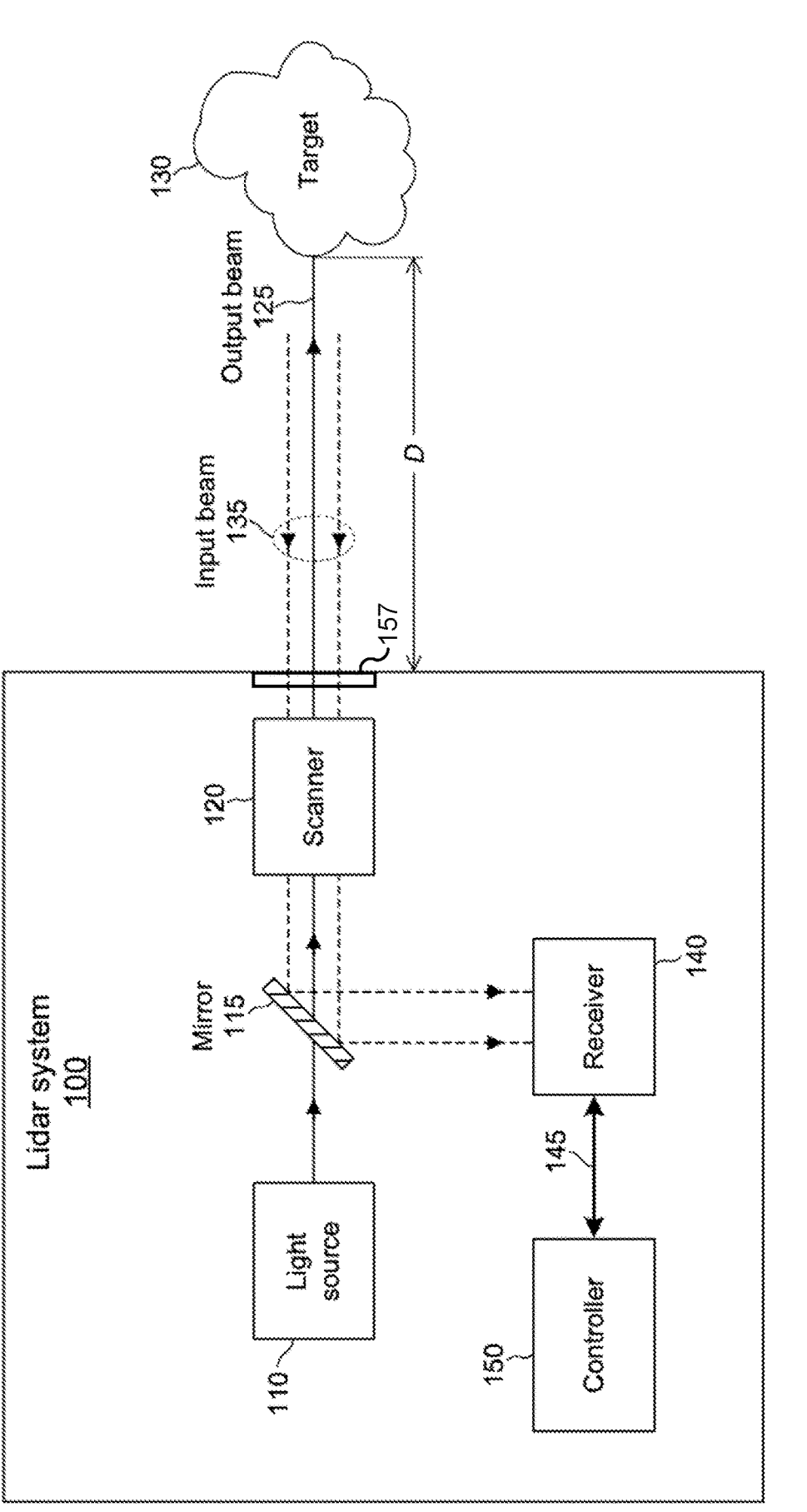
FIG. 1 illustrates an example light detection and ranging (lidar) system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Reflective material and markers for light source calibration is disclosed. In one embodiment, a system comprises a light source, a scanner, a reference reflectivity material, a detector, and a processor. The light source is configured to emit light, and the scanner is configured to scan the emitted light across at least a portion of a reachable region including a field of regard through a window. The reference reflectivity material is included internally within a housing of the system and located in the reachable region but outside the field of regard. The detector is configured to detect at least a portion of the emitted light scattered by the reference reflectivity material. The processor is configured to analyze detected information from the detector to determine an electrical property of the emitted light. In another embodiment, a system comprises a light source, a scanner, a reference location marker, a detector, and a processor. The light source is configured to emit light, and the scanner is configured to scan the emitted light across at least a portion of a reachable region including a field of regard through a window. The reference location marker is included internally within a housing of the system and located in the reachable region but outside the field of regard. The detector is configured to detect at least a portion of the emitted light scattered by the reference location marker. The processor is configured to analyze detected information from the detector to determine a variation associated with a detected location of the reference location marker.

Self-calibration of light detection and ranging (lidar) sensors is disclosed. Using the disclosed systems and techniques, calibration for pulse energy and optical axis drift can be performed. In particular embodiments, light is emitted from a light source and scattered by a reference reflectivity material (for pulse energy calibration) and/or reference location markers (for optical axis drift calibration).

In various embodiments, a lidar system comprises at least a light source and a scanner. The light source is configured to emit light, and the scanner is configured to scan the emitted light. For example, a light source such as a laser can emit light of a particular operating wavelength that is scanned by the scanner towards a particular scan region, such as an area in front of a vehicle and/or along the sides or behind the vehicle. The emitted light passes through a sensor window before reaching any downrange objects. In some embodiments, the sensor window is used at least in part to protect the lidar system, for example, from environmental elements such as road debris and weather. In various embodiments, the lidar system includes multiple detectors, for example, as part of a receiver module. The detectors can utilize different types of technology to detect scattered light. For example, one or more of the detectors can utilize avalanche photodiodes (APDs), one or more single-photon avalanche diodes (SPADs), one or more PN photodiodes, or one or more PIN photodiodes, etc. In some embodiments, a first detector of the lidar system is configured to detect at least a portion of the emitted light scattered by a target located downrange from the system. For example, the positioning of the first detector may be optimized to detect objects that are a certain distance from the lidar system and/or the application environment to which the lidar system is mounted, such as an automobile. In some embodiments, the first detector is optimized to detect objects that are up to 50 meters, 200 meters, or another distance away from the lidar system. In some embodiments, a second detector of the lidar system is configured to detect at least a portion of the emitted light scattered by a reference reflectivity material (for pulse energy calibration) and/or reference location markers (for optical axis drift calibration). In various embodiments, the first and second detectors are different detectors and are configured to detect different scatter patterns. One or more processors of the lidar system can be configured to analyze detected information from the detectors.

A lidar system may operate in a vehicle and includes multiple "eyes," each of which has its own field of regard, or an angular range over which the eye scans targets using pulses of light in accordance with a scan pattern. The fields of regard can combine along a certain dimension (e.g., horizontally) to define the overall field of regard of the lidar system. The lidar system then can use data received via both eyes to generate a point cloud or otherwise process the received data. In a two-eye configuration of the lidar system, the two eyes can be housed together and scan the respective fields of regard via a shared window or separate windows, or the eyes can be housed separately. In the latter case, an assembly referred to as a "sensor head" can include a scanner, a receiver, and an optical element such as a collimator or a laser diode to generate or convey a beam of light.

Depending on the implementation, each eye of a lidar system can include a separate scanner (e.g., each eye can be equipped with a pivotable scan mirror to scan the field of regard vertically and another pivotable scan mirror to scan the field of regard horizontally), a partially shared scanner (e.g., each eye can be equipped with a pivotable scan mirror to scan the field of regard vertically, and a shared polygon mirror can scan the corresponding fields of regard horizontally, using different reflective surfaces), or a fully shared scanner (e.g., a pivotable planar mirror can scan the fields of regard vertically by reflecting incident beams at different regions on the reflective surface, and a shared polygon mirror can scan the corresponding fields of regard horizontally, using different reflective surfaces).

Different hardware configurations allow the lidar system to operate the eyes more independently of each other, as is the case with separate scanners, or less independently, as is the case with a fully shared scanner. For example, the two or more eyes may scan the respective fields of regard using similar or different scan patterns. In one implementation, the two eyes trace out the same pattern, but with a certain time differential to maintain angular separation between light-source fields of view and thereby reduce the probability of cross-talk events between the sensor heads. In another implementation, the two eyes scan the corresponding fields of regard according to different scan patterns, at least in some operational states (e.g., when the vehicle is turning right or left). Further, according to one approach, two eyes of a lidar system are arranged so that the fields of regard of the eyes are adjacent and non-overlapping. For example, each field of regard can span approximately 60 degrees horizontally and 30 degrees vertically, so that the combined field of regard of the lidar system spans approximately 120 degrees horizontally and 30 degrees vertically. The corresponding scanners (or paths within a shared scanner) can point away from each other at a certain angle, for example, so that the respective fields of regard abut approximately at an axis corresponding to the forward-facing direction of the vehicle.

Alternatively, the lidar system can operate in a "cross-eyed" configuration to create an area of overlap between the fields of regard. The area of overlap can be approximately centered along the forward-facing direction or another direction, which in some implementations a controller can determine dynamically. In this implementation, the two sensor heads can yield a higher density of scan in the area that generally is more important. In some implementations, the fields of regard in a cross-eyed two-eye configuration are offset from each other by a half-pixel value, so that the area of overlap has twice as many pixels. In general, the fields of regard can overlap angularly or translationally. To reduce the probability of cross-talk events (e.g., the situation when a pulse emitted by the light source associated with the first eye is received by the receiver of the second eye), the lidar system can use output beams with different wavelengths.

FIG. 1 illustrates an example light detection and ranging (lidar) system 100. In particular embodiments, a lidar system 100 may be referred to as a laser ranging system, a laser radar system, a LIDAR system, a lidar sensor, or a laser detection and ranging (LADAR or ladar) system. In particular embodiments, a lidar system 100 may include a light source 110, mirror 115, scanner 120, receiver 140, controller 150, or sensor window 157. The light source 110 may include, for example, a laser which emits light having a particular operating wavelength in the infrared, visible, or ultraviolet portions of the electromagnetic spectrum. As an example, light source 110 may include a laser with one or more operating wavelengths between approximately 900 nanometers (nm) and 2000 nm. The light source 110 emits an output beam of light 125 which may be continuous wave (CW), pulsed, or modulated in any suitable manner for a given application. The output beam of light 125 is directed downrange toward a remote target 130. As an example, the remote target 130 may be located a distance D of approximately 1 m to 1 km from the lidar system 100.

Once the output beam 125 reaches the downrange target 130, the target may scatter or reflect at least a portion of light from the output beam 125, and some of the scattered or reflected light may return toward the lidar system 100. In the example of FIG. 1, the scattered or reflected light is represented by input beam 135, which passes through sensor window 157 and scanner 120 and is then reflected by mirror 115 and directed to receiver 140. In particular embodiments, a relatively small fraction of the light from output beam 125 may return to the lidar system 100 as input beam 135. As an example, the ratio of input beam 135 average power, peak power, or pulse energy to output beam 125 average power, peak power, or pulse energy may be approximately $10^{-1}$, $10^{-2}$, $10^{-3}$, $10^{-4}$, $10^{-5}$, $10^{-6}$, $10^{-7}$, $10^{-8}$, $10^{-9}$, $10^{-10}$, $10^{-11}$, or $10^{-12}$. As another example, if a pulse of output beam 125 has a pulse energy of 1 microjoule (μJ), then the pulse energy of a corresponding pulse of input beam 135 may have a pulse energy of approximately 10 nanojoules (nJ), 1 nJ, 100 picojoules (pJ), 10 pJ, 1 pJ, 100 femtojoules (fJ), 10 fJ, 1 fJ, 100 attojoules (aJ), 10 aJ, 1 aJ, or 0.1 aJ.

In particular embodiments, output beam 125 may include or may be referred to as an optical signal, output optical signal, emitted optical signal, output light, emitted pulse of light, laser beam, light beam, optical beam, emitted beam, emitted light, or beam. In particular embodiments, input beam 135 may include or may be referred to as a received optical signal, received pulse of light, input pulse of light, input optical signal, return beam, received beam, return light, received light, input light, scattered light, or reflected light. As used herein, scattered light may refer to light that is scattered or reflected by a target 130. As an example, an input beam 135 may include: light from the output beam 125 that is scattered by target 130; light from the output beam 125 that is reflected by target 130; or a combination of scattered and reflected light from target 130.

In various embodiments, lidar system 100 includes sensor window 157 through which the beams 125 and 135 pass. In some embodiments, one or more relatively high reflectivity regions (e.g., reflectivity of 1% to 5%) are located on sensor window 157 and can be utilized for calibration purposes (e.g., pulse energy and optical axis drift). The reflectivity regions can be of various sizes (e.g., small dots to large zones) depending on the type of calibration. Output beam 125 can be directed toward the reflectivity regions to perform calibration. In many scenarios, the reflectivity regions are not encountered while scanning a typical field of regard using output beam 125. Stated alternatively, the reflectivity regions do not interfere with normal operation of lidar system 100 when calibration using the reflectivity regions is not desired. When the reflectivity regions are utilized for calibration, the output beam of light source 110 may scatter or reflect at least a portion of light from the output beam 125. Some of the scattered or reflected light may return toward the lidar system 100. The light scattered or reflected can take a path similar to input beam 135. The light may pass through scanner 120 and be reflected by mirror 115 and directed to receiver 140.

In particular embodiments, receiver 140 may receive or detect photons from input beam 135 and produce one or more representative signals. For example, the receiver 140 may produce an output electrical signal 145 that is representative of the input beam 135, and the electrical signal 145 may be sent to controller 150. In particular embodiments, receiver 140 or controller 150 may include a processor, computing system (e.g., an ASIC or FPGA), or other suitable circuitry. A controller 150 may be configured to analyze one or more characteristics of the electrical signal 145 from the receiver 140 to determine one or more characteristics of the target 130, such as its distance downrange from the lidar system 100. This may be done, for example, by analyzing a time of flight or a frequency or phase of a transmitted beam of light 125 or a received beam of light 135. If lidar system 100 measures a time of flight of T (e.g., T represents a round-trip time of flight for an emitted pulse of light to travel from the lidar system 100 to the target 130 and back to the lidar system 100), then the distance D from the target 130 to the lidar system 100 may be expressed as D=c·T/2, where c is the speed of light (approximately $3.0 \times 10^8$ m/s). As an example, if a time of flight is measured to be T=300 ns, then the distance from the target 130 to the lidar system 100 may be determined to be approximately D=45.0 m. As another example, if a time of flight is measured to be T=1.33 μs, then the distance from the target 130 to the lidar system 100 may be determined to be approximately D=199.5 m. In particular embodiments, a distance D from lidar system 100 to a target 130 may be referred to as a distance, depth, or range of target 130. As used herein, the speed of light c refers to the speed of light in any suitable medium, such as for example in air, water, or vacuum. As an example, the speed of light in vacuum is approximately $2.9979 \times 10^8$ m/s, and the speed of light in air (which has a refractive index of approximately 1.0003) is approximately $2.9970 \times 10^8$ m/s.

In particular embodiments, light source 110 may include a pulsed or CW laser. As an example, light source 110 may be a pulsed laser configured to produce or emit pulses of light with a pulse duration or pulse width of approximately 10 picoseconds (ps) to 100 nanoseconds (ns). The pulses may have a pulse duration of approximately 100 μs, 200 μs, 400 μs, 1 ns, 2 ns, 5 ns, 10 ns, 20 ns, 50 ns, 100 ns, or any other suitable pulse duration. As another example, light source 110 may be a pulsed laser that produces pulses with a pulse duration of approximately 1-5 ns. As another example, light source 110 may be a pulsed laser that produces pulses at a pulse repetition frequency of approximately 100 kHz to 10 MHz or a pulse period (e.g., a time between consecutive pulses) of approximately 100 ns to 10 μs. In particular embodiments, light source 110 may have a substantially constant pulse repetition frequency, or light source 110 may have a variable or adjustable pulse repetition frequency. As an example, light source 110 may be a pulsed laser that produces pulses at a substantially constant pulse repetition frequency of approximately 640 kHz (e.g., 640,000 pulses per second), corresponding to a pulse period of approximately 1.56 μs. As another example, light source 110 may have a pulse repetition frequency (which may be referred to as a repetition rate) that can be varied from approximately 200 kHz to 3 MHz. As used herein, a pulse of light may be referred to as an optical pulse, a light pulse, or a pulse.

In particular embodiments, light source 110 may include a pulsed or CW laser that produces a free-space output beam 125 having any suitable average optical power. As an example, output beam 125 may have an average power of approximately 1 milliwatt (mW), 10 mW, 100 mW, 1 watt (W), 10 W, or any other suitable average power. In particular embodiments, output beam 125 may include optical pulses with any suitable pulse energy or peak optical power. As an example, output beam 125 may include pulses with a pulse energy of approximately 0.01 μJ, 0.1 μJ, 0.5 μJ, 1 μJ, 2 μJ, 10 μJ, 100 μJ, 1 mJ, or any other suitable pulse energy. As another example, output beam 125 may include pulses with a peak power of approximately 10 W, 100 W, 1 kW, 5 kW, 10 kW, or any other suitable peak power. The peak power $(P_{peak})$ of a pulse of light can be related to the pulse energy (E) by the expression $E = P_{peak} \cdot \Delta t$, where $\Delta t$ is the duration of the pulse, and the duration of a pulse may be defined as the full width at half maximum duration of the pulse. For example, an optical pulse with a duration of 1 ns and a pulse energy of 1 μJ has a peak power of approximately 1 kW. The average power $(P_{av})$ of an output beam 125 can be related to the pulse repetition frequency (PRF) and pulse energy by the expression $P_{av} = PRF \cdot E$. For example, if the pulse repetition frequency is 500 kHz, then the average power of an output beam 125 with 1-μJ pulses is approximately 0.5 W.

In particular embodiments, light source 110 may include a laser diode, such as for example, a Fabry-Perot laser diode, a quantum well laser, a distributed Bragg reflector (DBR) laser, a distributed feedback (DFB) laser, a vertical-cavity surface-emitting laser (VCSEL), a quantum dot laser diode, a grating-coupled surface-emitting laser (GCSEL), a slab-coupled optical waveguide laser (SCOWL), a single-transverse-mode laser diode, a multi-mode broad area laser diode, a laser-diode bar, a laser-diode stack, or a tapered-stripe laser diode. As an example, light source 110 may include an aluminum-gallium-arsenide (AlGaAs) laser diode, an indium-gallium-arsenide (InGaAs) laser diode, an indium-gallium-arsenide-phosphide (InGaAsP) laser diode, or a laser diode that includes any suitable combination of aluminum (Al), indium (In), gallium (Ga), arsenic (As), phosphorous (P), or any other suitable material. In particular embodiments, light source 110 may include a pulsed or CW laser diode with a peak emission wavelength between 1200 nm and 1600 nm. As an example, light source 110 may include a current-modulated InGaAsP DFB laser diode that produces optical pulses at a wavelength of approximately 1550 nm. As another example, light source 110 may include a laser diode that emits light at a wavelength between 1500 nm and 1510 nm.

In particular embodiments, light source 110 may include a pulsed or CW laser diode followed by one or more optical-amplification stages. For example, a seed laser diode may produce a seed optical signal, and an optical amplifier may amplify the seed optical signal to produce an amplified optical signal that is emitted by the light source 110. In particular embodiments, an optical amplifier may include a fiber-optic amplifier or a semiconductor optical amplifier (SOA). For example, a pulsed laser diode may produce relatively low-power optical seed pulses which are amplified by a fiber-optic amplifier. As another example, a light source 110 may include a fiber-laser module that includes a current-modulated laser diode with an operating wavelength of approximately 1550 nm followed by a single-stage or a multi-stage erbium-doped fiber amplifier (EDFA) or erbium-ytterbium-doped fiber amplifier (EYDFA) that amplifies the seed pulses from the laser diode. As another example, light source 110 may include a continuous-wave (CW) or quasi-CW laser diode followed by an external optical modulator (e.g., an electro-optic amplitude modulator). The optical modulator may modulate the CW light from the laser diode to produce optical pulses which are sent to a fiber-optic amplifier or SOA. As another example, light source 110 may include a pulsed or CW seed laser diode followed by a semiconductor optical amplifier (SOA). The SOA may include an active optical waveguide configured to receive light from the seed laser diode and amplify the light as it propagates through the waveguide. The optical gain of the SOA may be provided by pulsed or direct-current (DC) electrical current supplied to the SOA. The SOA may be integrated on the same chip as the seed laser diode, or the SOA may be a separate device with an anti-reflection coating on its input facet or output facet. As another example, light source 110 may include a seed laser diode followed by an SOA, which in turn is followed by a fiber-optic amplifier. For example, the seed laser diode may produce relatively low-power seed pulses which are amplified by the SOA, and the fiber-optic amplifier may further amplify the optical pulses.

In particular embodiments, light source 110 may include a direct-emitter laser diode. A direct-emitter laser diode (which may be referred to as a direct emitter) may include a laser diode which produces light that is not subsequently amplified by an optical amplifier. A light source 110 that includes a direct-emitter laser diode may not include an optical amplifier, and the output light produced by a direct emitter may not be amplified after it is emitted by the laser diode. The light produced by a direct-emitter laser diode (e.g., optical pulses, CW light, or frequency-modulated light) may be emitted directly as a free-space output beam 125 without being amplified. A direct-emitter laser diode may be driven by an electrical power source that supplies current pulses to the laser diode, and each current pulse may result in the emission of an output optical pulse.

In particular embodiments, light source 110 may include a diode-pumped solid-state (DPSS) laser. A DPSS laser (which may be referred to as a solid-state laser) may refer to a laser that includes a solid-state, glass, ceramic, or crystal-based gain medium that is pumped by one or more pump laser diodes. The gain medium may include a host material that is doped with rare-earth ions (e.g., neodymium, erbium, ytterbium, or praseodymium). For example, a gain medium may include a yttrium aluminum garnet (YAG) crystal that is doped with neodymium (Nd) ions, and the gain medium may be referred to as a Nd:YAG crystal. A DPSS laser with a Nd:YAG gain medium may produce light at a wavelength between approximately 1300 nm and approximately 1400 nm, and the Nd:YAG gain medium may be pumped by one or more pump laser diodes with an operating wavelength between approximately 730 nm and approximately 900 nm. A DPSS laser may be a passively Q-switched laser that includes a saturable absorber (e.g., a vanadium-doped crystal that acts as a saturable absorber). Alternatively, a DPSS laser may be an actively Q-switched laser that includes an active Q-switch (e.g., an acousto-optic modulator or an electro-optic modulator). A passively or actively Q-switched DPSS laser may produce output optical pulses that form an output beam 125 of a lidar system 100.

In particular embodiments, an output beam of light 125 emitted by light source 110 may be a collimated optical beam having any suitable beam divergence, such as for example, a full-angle beam divergence of approximately 0.5 to 10 milliradians (mrad). A divergence of output beam 125 may refer to an angular measure of an increase in beam size (e.g., a beam radius or beam diameter) as output beam 125 travels away from light source 110 or lidar system 100. In particular embodiments, output beam 125 may have a substantially circular cross section with a beam divergence characterized by a single divergence value. As an example, an output beam 125 with a circular cross section and a full-angle beam divergence of 2 mrad may have a beam diameter or spot size of approximately 20 cm at a distance of 100 m from lidar system 100. In particular embodiments, output beam 125 may have a substantially elliptical cross section characterized by two divergence values. As an example, output beam 125 may have a fast axis and a slow axis, where the fast-axis divergence is greater than the slow-axis divergence. As another example, output beam 125 may be an elliptical beam with a fast-axis divergence of 4 mrad and a slow-axis divergence of 2 mrad.

In particular embodiments, an output beam of light 125 emitted by light source 110 may be unpolarized or randomly polarized, may have no specific or fixed polarization (e.g., the polarization may vary with time), or may have a particular polarization (e.g., output beam 125 may be linearly polarized, elliptically polarized, or circularly polarized). As an example, light source 110 may produce light with no specific polarization or may produce light that is linearly polarized.

In particular embodiments, lidar system 100 may include one or more optical components configured to reflect, focus, filter, shape, modify, steer, or direct light within the lidar system 100 or light produced or received by the lidar system 100 (e.g., output beam 125 or input beam 135). As an example, lidar system 100 may include one or more lenses, mirrors, filters (e.g., band-pass or interference filters), beam splitters, optical splitters, polarizers, polarizing beam splitters, wave plates (e.g., half-wave or quarter-wave plates), diffractive elements, holographic elements, isolators, couplers, detectors, beam combiners, or collimators. The optical components in a lidar system 100 may be free-space optical components, fiber-coupled optical components, or a combination of free-space and fiber-coupled optical components.

In particular embodiments, lidar system 100 may include a telescope, one or more lenses, or one or more mirrors configured to expand, focus, or collimate the output beam 125 or the input beam 135 to a desired beam diameter or divergence. As an example, the lidar system 100 may include one or more lenses to focus the input beam 135 onto a photodetector of receiver 140. As another example, the lidar system 100 may include one or more flat mirrors or curved mirrors (e.g., concave, convex, or parabolic mirrors) to steer or focus the output beam 125 or the input beam 135. For example, the lidar system 100 may include an off-axis parabolic mirror to focus the input beam 135 onto a photodetector of receiver 140. As illustrated in FIG. 1, the lidar system 100 may include mirror 115 (which may be a metallic or dielectric mirror), and mirror 115 may be configured so that light beam 125 passes through the mirror 115 or passes along an edge or side of the mirror 115 and input beam 135 is reflected toward the receiver 140. As an example, mirror 115 (which may be referred to as an overlap mirror, superposition mirror, or beam-combiner mirror) may include a hole, slot, or aperture which output light beam 125 passes through. As another example, rather than passing through the mirror 115, the output beam 125 may be directed to pass alongside the mirror 115 with a gap (e.g., a gap of width approximately 0.1 mm, 0.5 mm, 1 mm, 2 mm, 5 mm, or 10 mm) between the output beam 125 and an edge of the mirror 115.

In particular embodiments, mirror 115 may provide for output beam 125 and input beam 135 to be substantially coaxial so that the two beams travel along approximately the same optical path (albeit in opposite directions). The input and output beams being substantially coaxial may refer to the beams being at least partially overlapped or sharing a common propagation axis so that input beam 135 and output beam 125 travel along substantially the same optical path (albeit in opposite directions). As an example, output beam 125 and input beam 135 may be parallel to each other to within less than 10 mrad, 5 mrad, 2 mrad, 1 mrad, 0.5 mrad, or 0.1 mrad. As output beam 125 is scanned across a field of regard, the input beam 135 may follow along with the output beam 125 so that the coaxial relationship between the two beams is maintained.

In particular embodiments, lidar system 100 may include a scanner 120 configured to scan an output beam 125 across a field of regard of the lidar system 100. As an example, scanner 120 may include one or more scanning mirrors configured to pivot, rotate, oscillate, or move in an angular manner about one or more rotation axes. The output beam 125 may be reflected by a scanning mirror, and as the scanning mirror pivots or rotates, the reflected output beam 125 may be scanned in a corresponding angular manner. As an example, a scanning mirror may be configured to periodically pivot back and forth over a 30-degree range, which results in the output beam 125 scanning back and forth across a 60-degree range (e.g., a 0-degree rotation by a scanning mirror results in a 20-degree angular scan of output beam 125).

In particular embodiments, a scanning mirror (which may be referred to as a scan mirror) may be attached to or mechanically driven by a scanner actuator or mechanism which pivots or rotates the mirror over a particular angular range (e.g., over a 5° angular range, 30° angular range, 60° angular range, 120° angular range, 360° angular range, or any other suitable angular range). A scanner actuator or mechanism configured to pivot or rotate a mirror may include a galvanometer scanner, a resonant scanner, a piezoelectric actuator, a voice coil motor, an electric motor (e.g., a DC motor, a brushless DC motor, a synchronous electric motor, or a stepper motor), a microelectromechanical systems (MEMS) device, or any other suitable actuator or mechanism. As an example, a scanner 120 may include a scanning mirror attached to a galvanometer scanner configured to pivot back and forth over a 1° to 30° angular range. As another example, a scanner 120 may include a scanning mirror that is attached to or is part of a MEMS device configured to scan over a 1° to 30° angular range. As another example, a scanner 120 may include a polygon mirror configured to rotate continuously in the same direction (e.g., rather than pivoting back and forth, the polygon mirror continuously rotates 360 degrees in a clockwise or counterclockwise direction). The polygon mirror may be coupled or attached to a synchronous motor configured to rotate the polygon mirror at a substantially fixed rotational frequency (e.g., a rotational frequency of approximately 1 Hz, 10 Hz, 50 Hz, 100 Hz, 500 Hz, or 1,000 Hz).

In particular embodiments, scanner 120 may be configured to scan the output beam 125 (which may include at least a portion of the light emitted by light source 110) across a field of regard of the lidar system 100. A field of regard (FOR) of a lidar system 100 may refer to an area, region, or angular range over which the lidar system 100 may be configured to scan or capture distance information. As an example, a lidar system 100 with an output beam 125 with a 30-degree scanning range may be referred to as having a 30-degree angular field of regard. As another example, a lidar system 100 with a scanning mirror that rotates over a 30-degree range may produce an output beam 125 that scans across a 60-degree range (e.g., a 60-degree FOR). In particular embodiments, lidar system 100 may have a FOR of approximately 10°, 20°, 40°, 60°, 120°, 360°, or any other suitable FOR.

In particular embodiments, scanner 120 may be configured to scan the output beam 125 horizontally and vertically, and lidar system 100 may have a particular FOR along the horizontal direction and another particular FOR along the vertical direction. As an example, lidar system 100 may have a horizontal FOR of 10° to 120° and a vertical FOR of 2° to 45°. In particular embodiments, scanner 120 may include a first scan mirror and a second scan mirror, where the first scan mirror directs the output beam 125 toward the second scan mirror, and the second scan mirror directs the output beam 125 downrange from the lidar system 100. As an example, the first scan mirror may scan the output beam 125 along a first direction, and the second scan mirror may scan the output beam 125 along a second direction that is substantially orthogonal to the first direction. As another example, the first scan mirror may scan the output beam 125 along a substantially horizontal direction, and the second scan mirror may scan the output beam 125 along a substantially vertical direction (or vice versa). As another example, the first and second scan mirrors may each be driven by galvanometer scanners. As another example, the first or second scan mirror may include a polygon mirror driven by an electric motor. In particular embodiments, scanner 120 may be referred to as a beam scanner, optical scanner, or laser scanner.

In particular embodiments, one or more scanning mirrors may be communicatively coupled to controller 150 which may control the scanning mirror(s) so as to guide the output beam 125 in a desired direction downrange or along a desired scan pattern. In particular embodiments, a scan pattern may refer to a pattern or path along which the output beam 125 is directed. As an example, scanner 120 may include two scanning mirrors configured to scan the output beam 125 across a 60° horizontal FOR and a 20° vertical FOR. The two scanner mirrors may be controlled to follow a scan path that substantially covers the 60°×20° FOR. As an example, the scan path may result in a point cloud with pixels that substantially cover the 60°×20° FOR. The pixels may be approximately evenly distributed across the 60°×20° FOR. Alternatively, the pixels may have a particular non-uniform distribution (e.g., the pixels may be distributed across all or a portion of the 60°×20° FOR, and the pixels may have a higher density in one or more particular regions of the 60°×20° FOR).

In particular embodiments, a lidar system 100 may include a scanner 120 with a solid-state scanning device. A solid-state scanning device may refer to a scanner 120 that scans an output beam 125 without the use of moving parts (e.g., without the use of a mechanical scanner, such as a mirror that rotates or pivots). For example, a solid-state scanner 120 may include one or more of the following: an optical phased array scanning device; a liquid-crystal scanning device; or a liquid lens scanning device. A solid-state scanner 120 may be an electrically addressable device that scans an output beam 125 along one axis (e.g., horizontally) or along two axes (e.g., horizontally and vertically). In particular embodiments, a scanner 120 may include a solid-state scanner and a mechanical scanner. For example, a scanner 120 may include an optical phased array scanner configured to scan an output beam 125 in one direction and a galvanometer scanner that scans the output beam 125 in an orthogonal direction. The optical phased array scanner may scan the output beam relatively rapidly in a horizontal direction across the field of regard (e.g., at a scan rate of 50 to 1,000 scan lines per second), and the galvanometer may pivot a mirror at a rate of 1-30 Hz to scan the output beam 125 vertically.

In particular embodiments, a lidar system 100 may include a light source 110 configured to emit pulses of light and a scanner 120 configured to scan at least a portion of the emitted pulses of light across a field of regard of the lidar system 100. One or more of the emitted pulses of light may be scattered by a target 130 located downrange from the lidar system 100, and a receiver 140 may detect at least a portion of the pulses of light scattered by the target 130. A receiver 140 may be referred to as a photoreceiver, optical receiver, optical sensor, detector, photodetector, or optical detector. In particular embodiments, lidar system 100 may include a receiver 140 that receives or detects at least a portion of input beam 135 and produces an electrical signal that corresponds to input beam 135. As an example, if input beam 135 includes an optical pulse, then receiver 140 may produce an electrical current or voltage pulse that corresponds to the optical pulse detected by receiver 140. As another example, receiver 140 may include one or more avalanche photodiodes (APDs) or one or more single-photon avalanche diodes (SPADs). As another example, receiver 140 may include one or more PN photodiodes (e.g., a photodiode structure formed by a p-type semiconductor and an n-type semiconductor, where the PN acronym refers to the structure having p-doped and n-doped regions) or one or more PIN photodiodes (e.g., a photodiode structure formed by an undoped intrinsic semiconductor region located between p-type and n-type regions, where the PIN acronym refers to the structure having p-doped, intrinsic, and n-doped regions). An APD, SPAD, PN photodiode, or PIN photodiode may each be referred to as a detector, photodetector, or photodiode. A detector may have an active region or an avalanche-multiplication region that includes silicon, germanium, silicon germanium, InGaAs, InAsSb (indium arsenide antimonide), AlAsSb (aluminum arsenide antimonide), or AlInAsSb (aluminum indium arsenide antimonide). The active region may refer to an area over which a detector may receive or detect input light. An active region may have any suitable size or diameter, such as for example, a diameter of approximately 10 μm, 25 μm, 50 μm, 80 μm, 100 μm, 200 μm, 500 μm, 1 mm, 2 mm, or 5 mm.

In particular embodiments, receiver 140 may include electronic circuitry that performs signal amplification, sampling, filtering, signal conditioning, analog-to-digital conversion, time-to-digital conversion, pulse detection, threshold detection, rising-edge detection, or falling-edge detection. As an example, receiver 140 may include a transimpedance amplifier that converts a received photocurrent (e.g., a current produced by an APD in response to a received optical signal) into a voltage signal. The voltage signal may be sent to pulse-detection circuitry that produces an analog or digital output signal 145 that corresponds to one or more optical characteristics (e.g., rising edge, falling edge, amplitude, duration, or energy) of a received optical pulse. As an example, the pulse-detection circuitry may perform a time-to-digital conversion to produce a digital output signal 145. The electrical output signal 145 may be sent to controller 150 for processing or analysis (e.g., to determine a time-of-flight value corresponding to a received optical pulse).

In particular embodiments, a controller 150 (which may include or may be referred to as a processor, an FPGA, an ASIC, a computer, or a computing system) may be located within a lidar system 100 or outside of a lidar system 100. Alternatively, one or more parts of a controller 150 may be located within a lidar system 100, and one or more other parts of a controller 150 may be located outside a lidar system 100. In particular embodiments, one or more parts of a controller 150 may be located within a receiver 140 of a lidar system 100, and one or more other parts of a controller 150 may be located in other parts of the lidar system 100. For example, a receiver 140 may include an FPGA or ASIC configured to process an output electrical signal from the receiver 140, and the processed signal may be sent to a computing system located elsewhere within the lidar system 100 or outside the lidar system 100. In particular embodiments, a controller 150 may include any suitable arrangement or combination of logic circuitry, analog circuitry, or digital circuitry.

In particular embodiments, controller 150 may be electrically coupled or communicatively coupled to light source 110, scanner 120, or receiver 140. As an example, controller 150 may receive electrical trigger pulses or edges from light source 110, where each pulse or edge corresponds to the emission of an optical pulse by light source 110. As another example, controller 150 may provide instructions, a control signal, or a trigger signal to light source 110 indicating when light source 110 should produce optical pulses. Controller 150 may send an electrical trigger signal that includes electrical pulses, where each electrical pulse results in the emission of an optical pulse by light source 110. In particular embodiments, the frequency, period, duration, pulse energy, peak power, average power, or wavelength of the optical pulses produced by light source 110 may be adjusted based on instructions, a control signal, or trigger pulses provided by controller 150. In particular embodiments, controller 150 may be coupled to light source 110 and receiver 140, and controller 150 may determine a time-of-flight value for an optical pulse based on timing information associated with when the pulse was emitted by light source 110 and when a portion of the pulse (e.g., input beam 135) was detected or received by receiver 140. In particular embodiments, controller 150 may include circuitry that performs signal amplification, sampling, filtering, signal conditioning, analog-to-digital conversion, time-to-digital conversion, pulse detection, threshold detection, rising-edge detection, or falling-edge detection.

In particular embodiments, lidar system 100 may include one or more processors (e.g., a controller 150) configured to determine a distance D from the lidar system 100 to a target 130 based at least in part on a round-trip time of flight for an emitted pulse of light to travel from the lidar system 100 to the target 130 and back to the lidar system 100. The target 130 may be at least partially contained within a field of regard of the lidar system 100 and located a distance D from the lidar system 100 that is less than or equal to an operating range ($R_{OP}$) of the lidar system 100. In particular embodiments, an operating range (which may be referred to as an operating distance) of a lidar system 100 may refer to a distance over which the lidar system 100 is configured to sense or identify targets 130 located within a field of regard of the lidar system 100. The operating range of lidar system 100 may be any suitable distance, such as for example, 25 m, 50 m, 100 m, 200 m, 250 m, 500 m, or 1 km. As an example, a lidar system 100 with a 200-m operating range may be configured to sense or identify various targets 130 located up to 200 m away from the lidar system 100. The operating range $R_{OP}$ of a lidar system 100 may be related to the time T between the emission of successive optical signals by the expression $R_{OP}=c\cdot\tau/2$. For a lidar system 100 with a 200-m operating range ($R_{OP}=200$ m), the time $\tau$ between successive pulses (which may be referred to as a pulse period, a pulse repetition interval (PRI), or a time period between pulses) is approximately $2\cdot R_{OP}/c\cong1.33$ μs. The pulse period $\tau$ may also correspond to the time of flight for a pulse to travel to and from a target 130 located a distance $R_{OP}$ from the lidar system 100. Additionally, the pulse period $\tau$ may be related to the pulse repetition frequency (PRF) by the expression $\tau=1/PRF$. For example, a pulse period of 1.33 μs corresponds to a PRF of approximately 752 kHz.

In particular embodiments, a lidar system 100 may be used to determine the distance to one or more downrange targets 130. By scanning the lidar system 100 across a field of regard, the system may be used to map the distance to a number of points within the field of regard. Each of these depth-mapped points may be referred to as a pixel or a voxel. A collection of pixels captured in succession (which may be referred to as a depth map, a point cloud, or a frame) may be rendered as an image or may be analyzed to identify or detect objects or to determine a shape or distance of objects within the FOR. As an example, a point cloud may cover a field of regard that extends 60° horizontally and 15° vertically, and the point cloud may include a frame of 100-2000 pixels in the horizontal direction by 4-400 pixels in the vertical direction.

In particular embodiments, lidar system 100 may be configured to repeatedly capture or generate point clouds of a field of regard at any suitable frame rate between approximately 0.1 frames per second (FPS) and approximately 1,000 FPS. As an example, lidar system 100 may generate point clouds at a frame rate of approximately 0.1 FPS, 0.5 FPS, 1 FPS, 2 FPS, 5 FPS, 10 FPS, 20 FPS, 100 FPS, 500 FPS, or 1,000 FPS. As another example, lidar system 100 may be configured to produce optical pulses at a rate of $5\times10^5$ pulses/second (e.g., the system may determine 500,000 pixel distances per second) and scan a frame of 1000×50 pixels (e.g., 50,000 pixels/frame), which corresponds to a point-cloud frame rate of 10 frames per second (e.g., 10 point clouds per second). In particular embodiments, a point-cloud frame rate may be substantially fixed, or a point-cloud frame rate may be dynamically adjustable. As an example, a lidar system 100 may capture one or more point clouds at a particular frame rate (e.g., 1 Hz) and then switch to capture one or more point clouds at a different frame rate (e.g., 10 Hz). A slower frame rate (e.g., 1 Hz) may be used to capture one or more high-resolution point clouds, and a faster frame rate (e.g., 10 Hz) may be used to rapidly capture multiple lower-resolution point clouds.

In particular embodiments, a lidar system 100 may be configured to sense, identify, or determine distances to one or more targets 130 within a field of regard. As an example, a lidar system 100 may determine a distance to a target 130, where all or part of the target 130 is contained within a field of regard of the lidar system 100. All or part of a target 130 being contained within a FOR of the lidar system 100 may refer to the FOR overlapping, encompassing, or enclosing at least a portion of the target 130. In particular embodiments, target 130 may include all or part of an object that is moving or stationary relative to lidar system 100. As an example, target 130 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects. In particular embodiments, a target may be referred to as an object.

In particular embodiments, light source 110, scanner 120, and receiver 140 may be packaged together within a single housing, where a housing may refer to a box, case, or enclosure that includes sensor window 157 and holds or contains all or part of a lidar system 100. As an example, a lidar-system enclosure may contain a light source 110, mirror 115, scanner 120, and receiver 140 of a lidar system 100. Additionally, the lidar-system enclosure may include a controller 150. The lidar-system enclosure may also include one or more electrical connections for conveying electrical power or electrical signals to or from the enclosure. In particular embodiments, one or more components of a lidar system 100 may be located remotely from a lidar-system enclosure. As an example, all or part of light source 110 may be located remotely from a lidar-system enclosure, and pulses of light produced by the light source 110 may be conveyed to the enclosure via optical fiber. As another example, all or part of a controller 150 may be located remotely from a lidar-system enclosure.

In particular embodiments, light source 110 may include an eye-safe laser, or lidar system 100 may be classified as an eye-safe laser system or laser product. An eye-safe laser, laser system, or laser product may refer to a system that includes a laser with an emission wavelength, average power, peak power, peak intensity, pulse energy, beam size, beam divergence, exposure time, or scanned output beam such that emitted light from the system presents little or no possibility of causing damage to a person's eyes. As an example, light source 110 or lidar system 100 may be classified as a Class 1 laser product (as specified by the 60825-1:2014 standard of the International Electrotechnical Commission (IEC)) or a Class I laser product (as specified by Title 21, Section 1040.10 of the United States Code of Federal Regulations (CFR)) that is safe under all conditions of normal use. In particular embodiments, lidar system 100 may be an eye-safe laser product (e.g., with a Class 1 or Class I classification) configured to operate at any suitable wavelength between approximately 900 nm and approximately 2100 nm. As an example, lidar system 100 may include a laser with an operating wavelength between approximately 1200 nm and approximately 1400 nm or between approximately 1400 nm and approximately 1600 nm, and the laser or the lidar system 100 may be operated in an eye-safe manner. As another example, lidar system 100 may be an eye-safe laser product that includes a scanned laser with an operating wavelength between approximately 900 nm and approximately 1700 nm. As another example, lidar system 100 may be a Class 1 or Class I laser product that includes a laser diode, fiber laser, or solid-state laser with an operating wavelength between approximately 1200 nm and approximately 1600 nm. As another example, lidar system 100 may have an operating wavelength between approximately 1500 nm and approximately 1510 nm.

In particular embodiments, one or more lidar systems 100 may be integrated into a vehicle. As an example, multiple lidar systems 100 may be integrated into a car to provide a complete 360-degree horizontal FOR around the car. As another example, 2-10 lidar systems 100, each system having a 45-degree to 180-degree horizontal FOR, may be combined together to form a sensing system that provides a point cloud covering a 360-degree horizontal FOR. The lidar systems 100 may be oriented so that adjacent FORs have an amount of spatial or angular overlap to allow data from the multiple lidar systems 100 to be combined or stitched together to form a single or continuous 360-degree point cloud. As an example, the FOR of each lidar system 100 may have approximately 1-30 degrees of overlap with an adjacent FOR. In particular embodiments, a vehicle may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, construction equipment, forklift, robot, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), unmanned aerial vehicle (e.g., drone), or spacecraft. In particular embodiments, a vehicle may include an internal combustion engine or an electric motor that provides propulsion for the vehicle.

In particular embodiments, one or more lidar systems 100 may be included in a vehicle as part of an advanced driver assistance system (ADAS) to assist a driver of the vehicle in operating the vehicle. For example, a lidar system 100 may be part of an ADAS that provides information (e.g., about the surrounding environment) or feedback to a driver (e.g., to alert the driver to potential problems or hazards) or that automatically takes control of part of a vehicle (e.g., a braking system or a steering system) to avoid collisions or accidents. A lidar system 100 may be part of a vehicle ADAS that provides adaptive cruise control, automated braking, automated parking, collision avoidance, alerts the driver to hazards or other vehicles, maintains the vehicle in the correct lane, or provides a warning if an object or another vehicle is in a blind spot.

In particular embodiments, one or more lidar systems 100 may be integrated into a vehicle as part of an autonomous-vehicle driving system. As an example, a lidar system 100 may provide information about the surrounding environment to a driving system of an autonomous vehicle. An autonomous-vehicle driving system may be configured to guide the autonomous vehicle through an environment surrounding the vehicle and toward a destination. An autonomous-vehicle driving system may include one or more computing systems that receive information from a lidar system 100 about the surrounding environment, analyze the received information, and provide control signals to the vehicle's driving systems (e.g., steering mechanism, accelerator, brakes, lights, or turn signals). As an example, a lidar system 100 integrated into an autonomous vehicle may provide an autonomous-vehicle driving system with a point cloud every 0.1 seconds (e.g., the point cloud has a 10 Hz update rate, representing 10 frames per second). The autonomous-vehicle driving system may analyze the received point clouds to sense or identify targets 130 and their respective locations, distances, or speeds, and the autonomous-vehicle driving system may update control signals based on this information. As an example, if lidar system 100 detects a vehicle ahead that is slowing down or stopping, the autonomous-vehicle driving system may send instructions to release the accelerator and apply the brakes.

In particular embodiments, an autonomous vehicle may be referred to as an autonomous car, driverless car, self-driving car, robotic car, or unmanned vehicle. In particular embodiments, an autonomous vehicle may refer to a vehicle configured to sense its environment and navigate or drive with little or no human input. As an example, an autonomous vehicle may be configured to drive to any suitable location and control or perform all safety-critical functions (e.g., driving, steering, braking, parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

In particular embodiments, an autonomous vehicle may be configured to drive with a driver present in the vehicle, or an autonomous vehicle may be configured to operate the vehicle with no driver present. As an example, an autonomous vehicle may include a driver's seat with associated controls (e.g., steering wheel, accelerator pedal, and brake pedal), and the vehicle may be configured to drive with no one seated in the driver's seat or with little or no input from a person seated in the driver's seat. As another example, an autonomous vehicle may not include any driver's seat or associated driver's controls, and the vehicle may perform substantially all driving functions (e.g., driving, steering, braking, parking, and navigating) without human input. As another example, an autonomous vehicle may be configured to operate without a driver (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

In particular embodiments, an optical signal (which may be referred to as a light signal, a light waveform, an optical waveform, an output beam, an emitted optical signal, or emitted light) may include pulses of light, CW light, amplitude-modulated light, frequency-modulated (FM) light, or any suitable combination thereof. Although this disclosure describes or illustrates example embodiments of lidar systems 100 or light sources 110 that produce optical signals that include pulses of light, the embodiments described or illustrated herein may also be applied, where appropriate, to other types of optical signals, including continuous-wave (CW) light, amplitude-modulated optical signals, or frequency-modulated optical signals. For example, a lidar system 100 as described or illustrated herein may be a pulsed lidar system and may include a light source 110 that produces pulses of light. Alternatively, a lidar system 100 may be configured to operate as a frequency-modulated continuous-wave (FMCW) lidar system and may include a light source 110 that produces CW light or a frequency-modulated optical signal.

In particular embodiments, a lidar system 100 may be an FMCW lidar system where the emitted light from the light source 110 (e.g., output beam 125 in FIG. 1 or FIG. 3) includes frequency-modulated light. A pulsed lidar system is a type of lidar system 100 in which the light source 110 emits pulses of light, and the distance to a remote target 130 is determined based on the round-trip time-of-flight for a pulse of light to travel to the target 130 and back. Another type of lidar system 100 is a frequency-modulated lidar system, which may be referred to as a frequency-modulated continuous-wave (FMCW) lidar system. An FMCW lidar system uses frequency-modulated light to determine the distance to a remote target 130 based on a frequency of received light (which includes emitted light scattered by the remote target) relative to a frequency of local-oscillator (LO) light. A round-trip time for the emitted light to travel to a target 130 and back to the lidar system may correspond to a frequency difference between the received scattered light and the LO light. A larger frequency difference may correspond to a longer round-trip time and a greater distance to the target 130.

A light source 110 for a FMCW lidar system may include (i) a direct-emitter laser diode, (ii) a seed laser diode followed by an SOA, (iii) a seed laser diode followed by a fiber-optic amplifier, or (iv) a seed laser diode followed by an SOA and then a fiber-optic amplifier. A seed laser diode or a direct-emitter laser diode may be operated in a CW manner (e.g., by driving the laser diode with a substantially constant DC current), and a frequency modulation may be provided by an external modulator (e.g., an electro-optic phase modulator may apply a frequency modulation to seed-laser light). Alternatively, a frequency modulation may be produced by applying a current modulation to a seed laser diode or a direct-emitter laser diode. The current modulation (which may be provided along with a DC bias current) may produce a corresponding refractive-index modulation in the laser diode, which results in a frequency modulation of the light emitted by the laser diode. The current-modulation component (and the corresponding frequency modulation) may have any suitable frequency or shape (e.g., piecewise linear, sinusoidal, triangle-wave, or sawtooth). For example, the current-modulation component (and the resulting frequency modulation of the emitted light) may increase or decrease monotonically over a particular time interval. As another example, the current-modulation component may include a triangle or sawtooth wave with an electrical current that increases or decreases linearly over a particular time interval, and the light emitted by the laser diode may include a corresponding frequency modulation in which the optical frequency increases or decreases approximately linearly over the particular time interval. For example, a light source 110 that emits light with a linear frequency change of 200 MHz over a 2-$\mu$s time interval may be referred to as having a frequency modulation m of $10^{14}$ Hz/s (or, 100 MHz/$\mu$s).

In addition to producing frequency-modulated emitted light, a light source 110 may also produce frequency-modulated local-oscillator (LO) light. The LO light may be coherent with the emitted light, and the frequency modulation of the LO light may match that of the emitted light. The LO light may be produced by splitting off a portion of the emitted light prior to the emitted light exiting the lidar system. Alternatively, the LO light may be produced by a seed laser diode or a direct-emitter laser diode that is part of the light source 110. For example, the LO light may be emitted from the back facet of a seed laser diode or a direct-emitter laser diode, or the LO light may be split off from the seed light emitted from the front facet of a seed laser diode. The received light (e.g., emitted light that is scattered by a target 130) and the LO light may each be frequency modulated, with a frequency difference or offset that corresponds to the distance to the target 130. For a linearly chirped light source (e.g., a frequency modulation that produces a linear change in frequency with time), the larger the frequency difference is between the received light and the LO light, the farther away the target 130 is located.

A frequency difference between received light and LO light may be determined by mixing the received light with the LO light (e.g., by coupling the two beams onto a detector so they are coherently mixed together at the detector) and determining the resulting beat frequency. For example, a photocurrent signal produced by an APD may include a beat signal resulting from the coherent mixing of the received light and the LO light, and a frequency of the beat signal may correspond to the frequency difference between the received light and the LO light. The photocurrent signal from an APD (or a voltage signal that corresponds to the photocurrent signal) may be analyzed using a frequency-analysis technique (e.g., a fast Fourier transform (FFT) technique) to determine the frequency of the beat signal. If a linear frequency modulation m (e.g., in units of Hz/s) is applied to a CW laser, then the round-trip time T may be related to the frequency difference $\Delta f$ between the received scattered light and the LO light by the expression T=$\Delta f$/m. Additionally, the distance D from the target 130 to the lidar system 100 may be expressed as D=($\Delta f$/m)·c/2, where c is the speed of light. For example, for a light source 110 with a linear frequency modulation of $10^{14}$ Hz/s, if a frequency difference (between the received scattered light and the LO light) of 33 MHz is measured, then this corresponds to a round-trip time of approximately 330 ns and a distance to the target of approximately 50 meters. As another example, a frequency difference of 133 MHz corresponds to a round-trip time of approximately 1.33 $\mu$s and a distance to the target of approximately 200 meters. A receiver or processor of an FMCW lidar system may determine a frequency difference between received scattered light and LO light, and the distance to a target may be determined based on the frequency difference. The frequency difference $\Delta f$ between received scattered light and LO light corresponds to the round-trip time T (e.g., through the relationship T=Δf/m), and determining the frequency difference may correspond to or may be referred to as determining the round-trip time.

Figure 2:
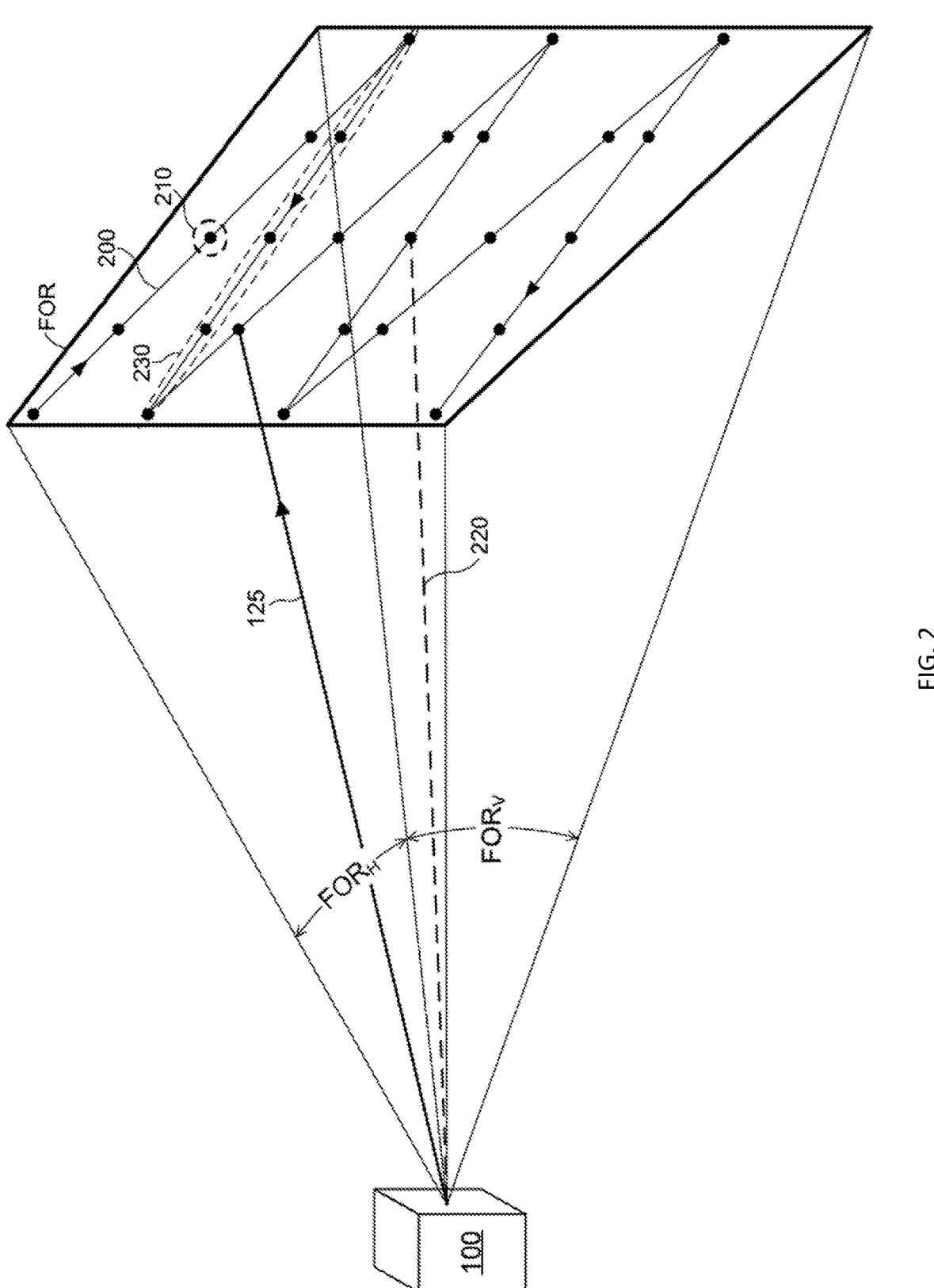
FIG. 2 illustrates an example scan pattern produced by a lidar system.

FIG. 2 illustrates an example scan pattern 200 produced by a lidar system 100. A scanner 120 of the lidar system 100 may scan the output beam 125 (which may include multiple emitted optical signals) along a scan pattern 200 that is contained within a FOR of the lidar system 100. A scan pattern 200 (which may be referred to as an optical scan pattern, optical scan path, scan path, or scan) may represent a path or course followed by output beam 125 as it is scanned across all or part of a FOR. Each traversal of a scan pattern 200 may correspond to the capture of a single frame or a single point cloud. In particular embodiments, a lidar system 100 may be configured to scan output optical beam 125 along one or more particular scan patterns 200. In particular embodiments, a scan pattern 200 may scan across any suitable field of regard (FOR) having any suitable horizontal FOR (FOR$_H$) and any suitable vertical FOR (FOR$_V$). For example, a scan pattern 200 may have a field of regard represented by angular dimensions (e.g., FOR$_H$× FOR$_V$) 40°×30°, 90°×40°, or 60°×15°. As another example, a scan pattern 200 may have a FOR$_H$ greater than or equal to 10°, 25°, 30°, 40°, 60°, 90°, or 120°. As another example, a scan pattern 200 may have a FOR$_V$ greater than or equal to 2°, 5°, 10°, 15°, 20°, 30°, or 45°.

In the example of FIG. 2, reference line 220 represents a center of the field of regard of scan pattern 200. In particular embodiments, reference line 220 may have any suitable orientation, such as for example, a horizontal angle of 0° (e.g., reference line 220 may be oriented straight ahead) and a vertical angle of 0° (e.g., reference line 220 may have an inclination of 0°), or reference line 220 may have a nonzero horizontal angle or a nonzero inclination (e.g., a vertical angle of +10° or −10°). In FIG. 2, if the scan pattern 200 has a 60°×15° field of regard, then scan pattern 200 covers a ±30° horizontal range with respect to reference line 220 and a ±7.5° vertical range with respect to reference line 220. Additionally, optical beam 125 in FIG. 2 has an orientation of approximately −15° horizontal and +3° vertical with respect to reference line 220. Optical beam 125 may be referred to as having an azimuth of −15° and an altitude of +3° relative to reference line 220. In particular embodiments, an azimuth (which may be referred to as an azimuth angle) may represent a horizontal angle with respect to reference line 220, and an altitude (which may be referred to as an altitude angle, elevation, or elevation angle) may represent a vertical angle with respect to reference line 220.

In particular embodiments, a scan pattern 200 may include multiple pixels 210, and each pixel 210 may be associated with one or more laser pulses or one or more distance measurements. Additionally, a scan pattern 200 may include multiple scan lines 230, where each scan line represents one scan across at least part of a field of regard, and each scan line 230 may include multiple pixels 210. In FIG. 2, scan line 230 includes five pixels 210 and corresponds to an approximately horizontal scan across the FOR from right to left, as viewed from the lidar system 100. In particular embodiments, a cycle of scan pattern 200 may include a total of P$_x$×P$_y$ pixels 210 (e.g., a two-dimensional distribution of P$_x$ by P$_y$ pixels). As an example, scan pattern 200 may include a distribution with dimensions of approximately 100-2,000 pixels 210 along a horizontal direction and approximately 4-400 pixels 210 along a vertical direction. As another example, scan pattern 200 may include a distribution of 1,000 pixels 210 along the horizontal direction by 64 pixels 210 along the vertical direction (e.g., the frame size is 1000×64 pixels) for a total of 64,000 pixels per cycle of scan pattern 200. In particular embodiments, the number of pixels 210 along a horizontal direction may be referred to as a horizontal resolution of scan pattern 200, and the number of pixels 210 along a vertical direction may be referred to as a vertical resolution. As an example, scan pattern 200 may have a horizontal resolution of greater than or equal to 100 pixels 210 and a vertical resolution of greater than or equal to 4 pixels 210. As another example, scan pattern 200 may have a horizontal resolution of 100-2,000 pixels 210 and a vertical resolution of 4-400 pixels 210.

In particular embodiments, a pixel 210 may refer to a data element that includes (i) distance information (e.g., a distance from a lidar system 100 to a target 130 from which an associated pulse of light was scattered) or (ii) an elevation angle and an azimuth angle associated with the pixel (e.g., the elevation and azimuth angles along which the associated pulse of light was emitted). Each pixel 210 may be associated with a distance (e.g., a distance to a portion of a target 130 from which an associated laser pulse was scattered) or one or more angular values. As an example, a pixel 210 may be associated with a distance value and two angular values (e.g., an azimuth and altitude) that represent the angular location of the pixel 210 with respect to the lidar system 100. A distance to a portion of target 130 may be determined based at least in part on a time-of-flight measurement for a corresponding pulse. An angular value (e.g., an azimuth or altitude) may correspond to an angle (e.g., relative to reference line 220) of output beam 125 (e.g., when a corresponding pulse is emitted from lidar system 100) or an angle of input beam 135 (e.g., when an input signal is received by lidar system 100). In particular embodiments, an angular value may be determined based at least in part on a position of a component of scanner 120. As an example, an azimuth or altitude value associated with a pixel 210 may be determined from an angular position of one or more corresponding scanning mirrors of scanner 120.

Figure 3:
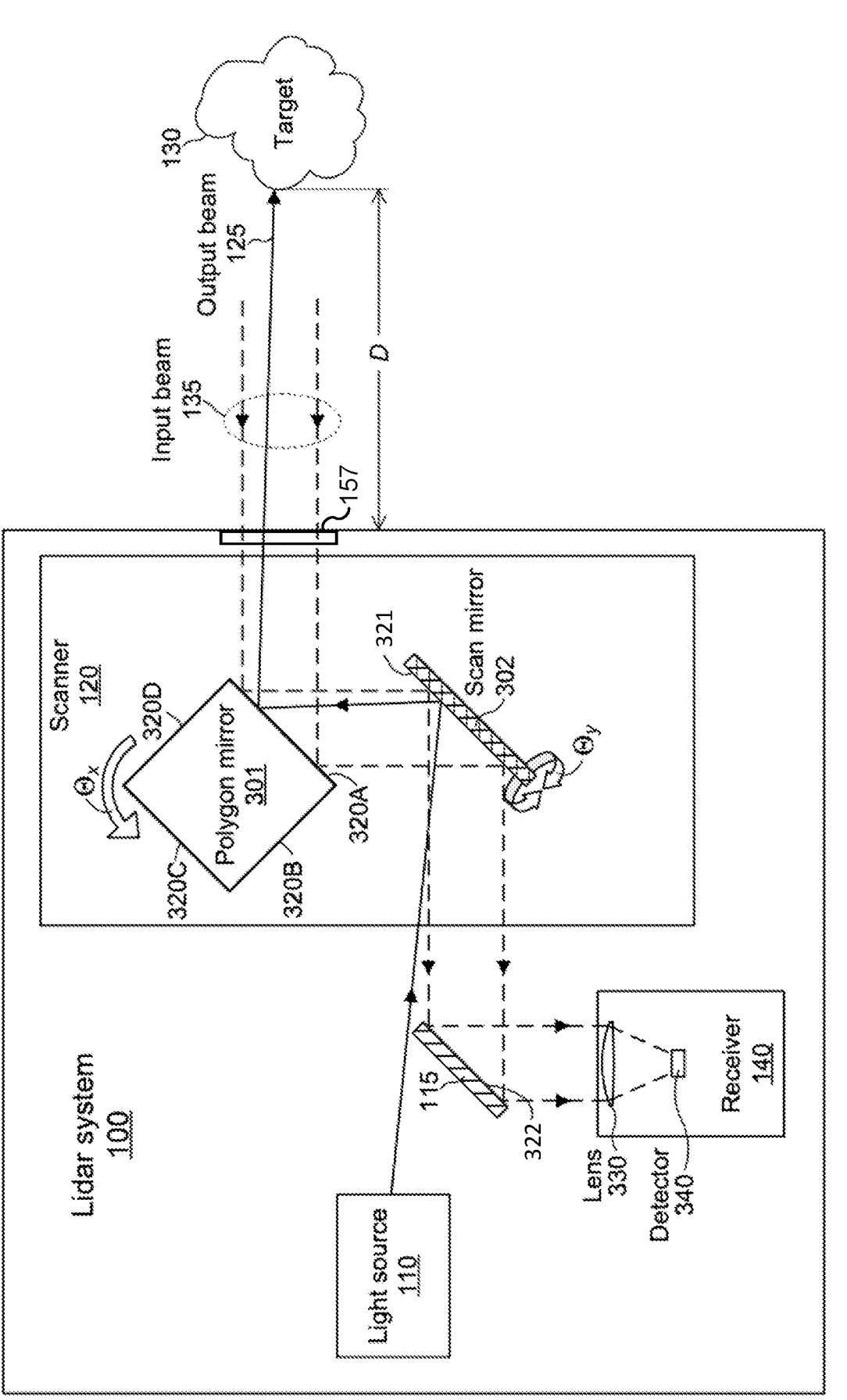
FIG. 3 illustrates an example lidar system with an example rotating polygon mirror.

FIG. 3 illustrates an example lidar system 100 with an example rotating polygon mirror 301. In particular embodiments, a scanner 120 may include a polygon mirror 301 configured to scan output beam 125 along a particular direction. In the example of FIG. 3, scanner 120 includes two scanning mirrors: (1) a polygon mirror 301 that rotates along the θ$_x$ direction and (2) a scanning mirror 302 that oscillates back and forth along the θ$_y$ direction. The output beam 125 from light source 110, which passes alongside mirror 115, is reflected by reflecting surface 321 of scan mirror 302, is then reflected by a reflecting surface (e.g., surface 320A, 320B, 320C, or 320D) of polygon mirror 301, and then passes through sensor window 157. Scattered light from a target 130 returns to the lidar system 100 as input beam 135. The input beam 135 passes through sensor window 157 and then reflects from polygon mirror 301, scan mirror 302, and mirror 115, which directs input beam 135 through focusing lens 330 and to the detector 340 of receiver 140. As shown in FIG. 3, scan mirror 302 includes reflecting surface 321 and mirror 115 includes reflecting surface 322. The detector 340 may be a PN photodiode, a PIN photodiode, an APD, an SPAD, or any other suitable detector. A reflecting surface 320 (which may be referred to as a reflective surface) may include a reflective metallic coating (e.g., gold, silver, or aluminum) or a reflective dielectric coating, and the reflecting surface 320 may have any suitable reflectivity R at an operating wavelength of the light source 110 (e.g., R greater than or equal to 70%, 80%, 90%, 95%, 98%, or 99%).

In particular embodiments, a polygon mirror 301 may be configured to rotate along a $\theta_x$ or $\theta_y$ direction and scan output beam 125 along a substantially horizontal or vertical direction, respectively. A rotation along a $\theta_x$ direction may refer to a rotational motion of mirror 301 that results in output beam 125 scanning along a substantially horizontal direction. Similarly, a rotation along a $\theta_y$ direction may refer to a rotational motion that results in output beam 125 scanning along a substantially vertical direction. In FIG. 3, mirror 301 is a polygon mirror that rotates along the $\theta_x$ direction and scans output beam 125 along a substantially horizontal direction, and mirror 302 pivots along the $\theta_y$ direction and scans output beam 125 along a substantially vertical direction. In particular embodiments, a polygon mirror 301 may be configured to scan output beam 125 along any suitable direction. As an example, a polygon mirror 301 may scan output beam 125 at any suitable angle with respect to a horizontal or vertical direction, such as for example, at an angle of approximately 0°, 10°, 20°, 30°, 45°, 60°, 70°, 80°, or 900 with respect to a horizontal or vertical direction.

In particular embodiments, a polygon mirror 301 may refer to a multi-sided object having reflective surfaces 320 on two or more of its sides or faces. As an example, a polygon mirror may include any suitable number of reflective faces (e.g., 2, 3, 4, 5, 6, 7, 8, or 10 faces), where each face includes a reflective surface 320. A polygon mirror 301 may have a cross-sectional shape of any suitable polygon, such as for example, a triangle (with three reflecting surfaces 320), square (with four reflecting surfaces 320), pentagon (with five reflecting surfaces 320), hexagon (with six reflecting surfaces 320), heptagon (with seven reflecting surfaces 320), or octagon (with eight reflecting surfaces 320). In FIG. 3, the polygon mirror 301 has a substantially square cross-sectional shape and four reflecting surfaces (320A, 320B, 320C, and 320D). The polygon mirror 301 in FIG. 3 may be referred to as a square mirror, a cube mirror, or a four-sided polygon mirror. In FIG. 3, the polygon mirror 301 may have a shape similar to a cube, cuboid, or rectangular prism. Additionally, the polygon mirror 301 may have a total of six sides, where four of the sides include faces with reflective surfaces (320A, 320B, 320C, and 320D).

In particular embodiments, a polygon mirror 301 may be continuously rotated in a clockwise or counter-clockwise rotation direction about a rotation axis of the polygon mirror 301. The rotation axis may correspond to a line that is perpendicular to the plane of rotation of the polygon mirror 301 and that passes through the center of mass of the polygon mirror 301. In FIG. 3, the polygon mirror 301 rotates in the plane of the drawing, and the rotation axis of the polygon mirror 301 is perpendicular to the plane of the drawing. An electric motor may be configured to rotate a polygon mirror 301 at a substantially fixed frequency (e.g., a rotational frequency of approximately 1 Hz (or 1 revolution per second), 10 Hz, 50 Hz, 100 Hz, 500 Hz, or 1,000 Hz). As an example, a polygon mirror 301 may be mechanically coupled to an electric motor (e.g., a synchronous electric motor) which is configured to spin the polygon mirror 301 at a rotational speed of approximately 160 Hz (or, 9600 revolutions per minute (RPM)).

In particular embodiments, output beam 125 may be reflected sequentially from the reflective surfaces 320A, 320B, 320C, and 320D as the polygon mirror 301 is rotated. This results in the output beam 125 being scanned along a particular scan axis (e.g., a horizontal or vertical scan axis) to produce a sequence of scan lines, where each scan line corresponds to a reflection of the output beam 125 from one of the reflective surfaces of the polygon mirror 301. In FIG.

3, the output beam 125 reflects off of reflective surface 320A to produce one scan line. Then, as the polygon mirror 301 rotates, the output beam 125 reflects off of reflective surfaces 320B, 320C, and 320D to produce a second, third, and fourth respective scan line. In particular embodiments, a lidar system 100 may be configured so that the output beam 125 is first reflected from polygon mirror 301 and then from scan mirror 302 (or vice versa). As an example, an output beam 125 from light source 110 may first be directed to polygon mirror 301, where it is reflected by a reflective surface of the polygon mirror 301, and then the output beam 125 may be directed to scan mirror 302, where it is reflected by reflective surface 321 of the scan mirror 302. In the example of FIG. 3, the output beam 125 is reflected from the polygon mirror 301 and the scan mirror 302 in the reverse order. In FIG. 3, the output beam 125 from light source 110 is first directed to the scan mirror 302, where it is reflected by reflective surface 321, and then the output beam 125 is directed to the polygon mirror 301, where it is reflected by reflective surface 320A.

Figure 4:
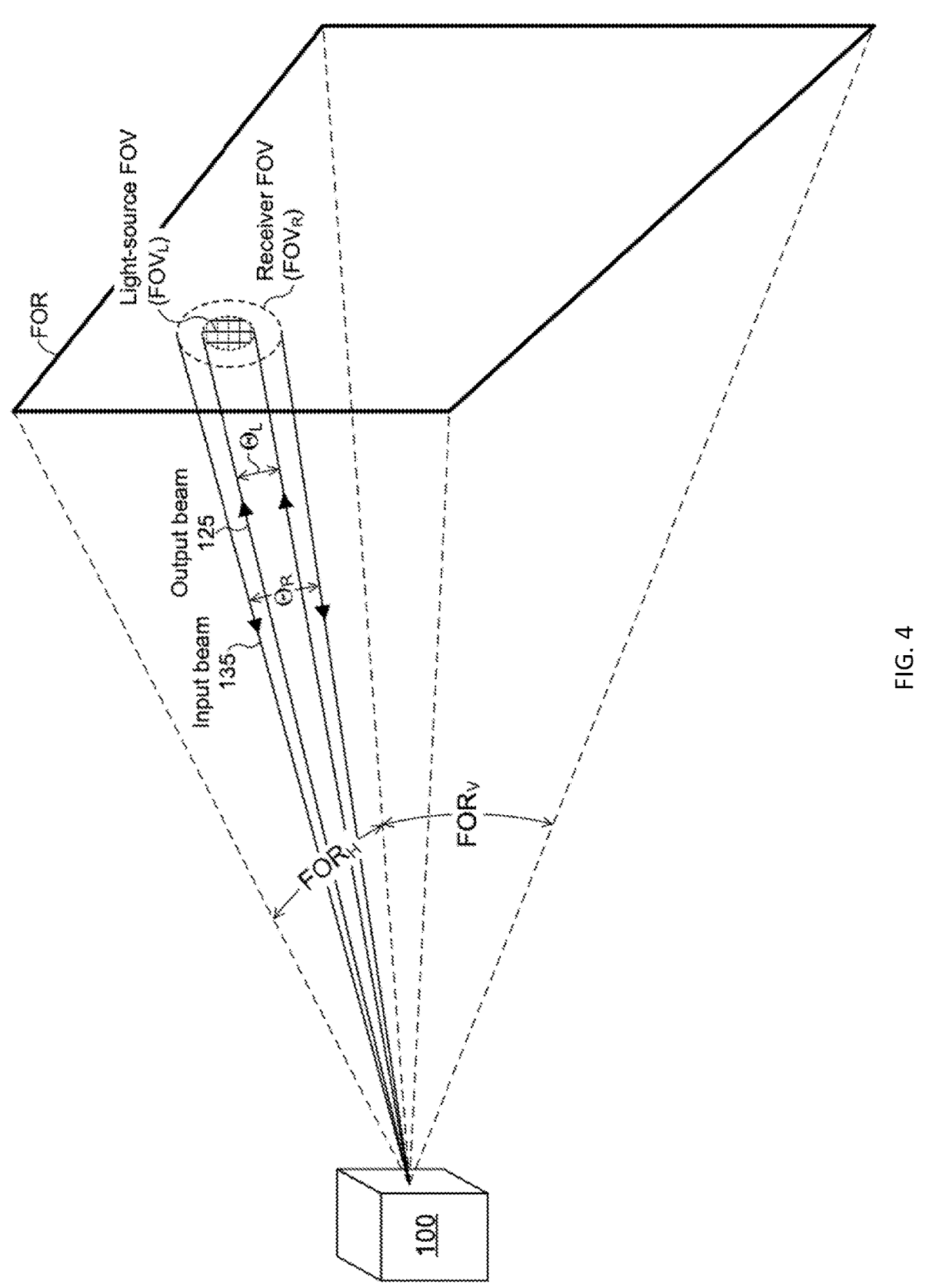
FIG. 4 illustrates an example light-source field of view (FOVL) and receiver field of view (FOVR) for a lidar system.

FIG. 4 illustrates an example light-source field of view (FOVL) and receiver field of view (FOVR) for a lidar system 100. A light source 110 of lidar system 100 may emit pulses of light as the FOVL and FOVR are scanned by scanner 120 across a field of regard (FOR). In particular embodiments, a light-source field of view may refer to an angular cone illuminated by the light source 110 at a particular instant of time. Similarly, a receiver field of view may refer to an angular cone over which the receiver 140 may receive or detect light at a particular instant of time, and any light outside the receiver field of view may not be received or detected. As an example, as the light-source field of view is scanned across a field of regard, a portion of a pulse of light emitted by the light source 110 may be sent downrange from lidar system 100, and the pulse of light may be sent in the direction that the FOVL is pointing at the time the pulse is emitted. The pulse of light may scatter off a target 130, and the receiver 140 may receive and detect a portion of the scattered light that is directed along or contained within the FOVR.

In particular embodiments, scanner 120 may be configured to scan both a light-source field of view and a receiver field of view across a field of regard of the lidar system 100. Multiple pulses of light may be emitted and detected as the scanner 120 scans the FOVL and FOVR across the field of regard of the lidar system 100 while tracing out a scan pattern 200. In particular embodiments, the light-source field of view and the receiver field of view may be scanned synchronously with respect to one another, so that as the FOVL is scanned across a scan pattern 200, the FOVR follows substantially the same path at the same scanning speed. Additionally, the FOVL and FOVR may maintain the same relative position to one another as they are scanned across the field of regard. As an example, the FOVL may be substantially overlapped with or centered inside the FOVR (as illustrated in FIG. 4), and this relative positioning between FOVL and FOVR may be maintained throughout a scan. As another example, the FOVR may lag behind the FOVL by a particular, fixed amount throughout a scan (e.g., the FOVR may be offset from the FOVL in a direction opposite the scan direction).

In particular embodiments, the FOVL may have an angular size or extent OL that is substantially the same as or that corresponds to the divergence of the output beam 125, and the FOVR may have an angular size or extent OR that corresponds to an angle over which the receiver 140 may receive and detect light. In particular embodiments, the receiver field of view may be any suitable size relative to the light-source field of view. As an example, the receiver field of view may be smaller than, substantially the same size as, or larger than the angular extent of the light-source field of view. In particular embodiments, the light-source field of view may have an angular extent of less than or equal to 50 milliradians, and the receiver field of view may have an angular extent of less than or equal to 50 milliradians. The FOVL may have any suitable angular extent OL, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. Similarly, the FOVR may have any suitable angular extent OR, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. In particular embodiments, the light-source field of view and the receiver field of view may have approximately equal angular extents. As an example, $\theta_L$ and $\theta_R$ may both be approximately equal to 1 mrad, 2 mrad, or 4 mrad. In particular embodiments, the receiver field of view may be larger than the light-source field of view, or the light-source field of view may be larger than the receiver field of view. As an example, $\theta_L$ may be approximately equal to 3 mrad, and $\theta_R$ may be approximately equal to 4 mrad. As another example, $\theta_R$ may be approximately L times larger than $\theta_L$, where L is any suitable factor, such as for example, 1.1, 1.2, 1.5, 2, 3, 5, or 10.

In particular embodiments, a pixel 210 may represent or may correspond to a light-source field of view or a receiver field of view. As the output beam 125 propagates from the light source 110, the diameter of the output beam 125 (as well as the size of the corresponding pixel 210) may increase according to the beam divergence $\theta_L$. As an example, if the output beam 125 has a $\theta_L$ of 2 mrad, then at a distance of 100 m from the lidar system 100, the output beam 125 may have a size or diameter of approximately 20 cm, and a corresponding pixel 210 may also have a corresponding size or diameter of approximately 20 cm. At a distance of 200 m from the lidar system 100, the output beam 125 and the corresponding pixel 210 may each have a diameter of approximately 40 cm.

Figure 5:
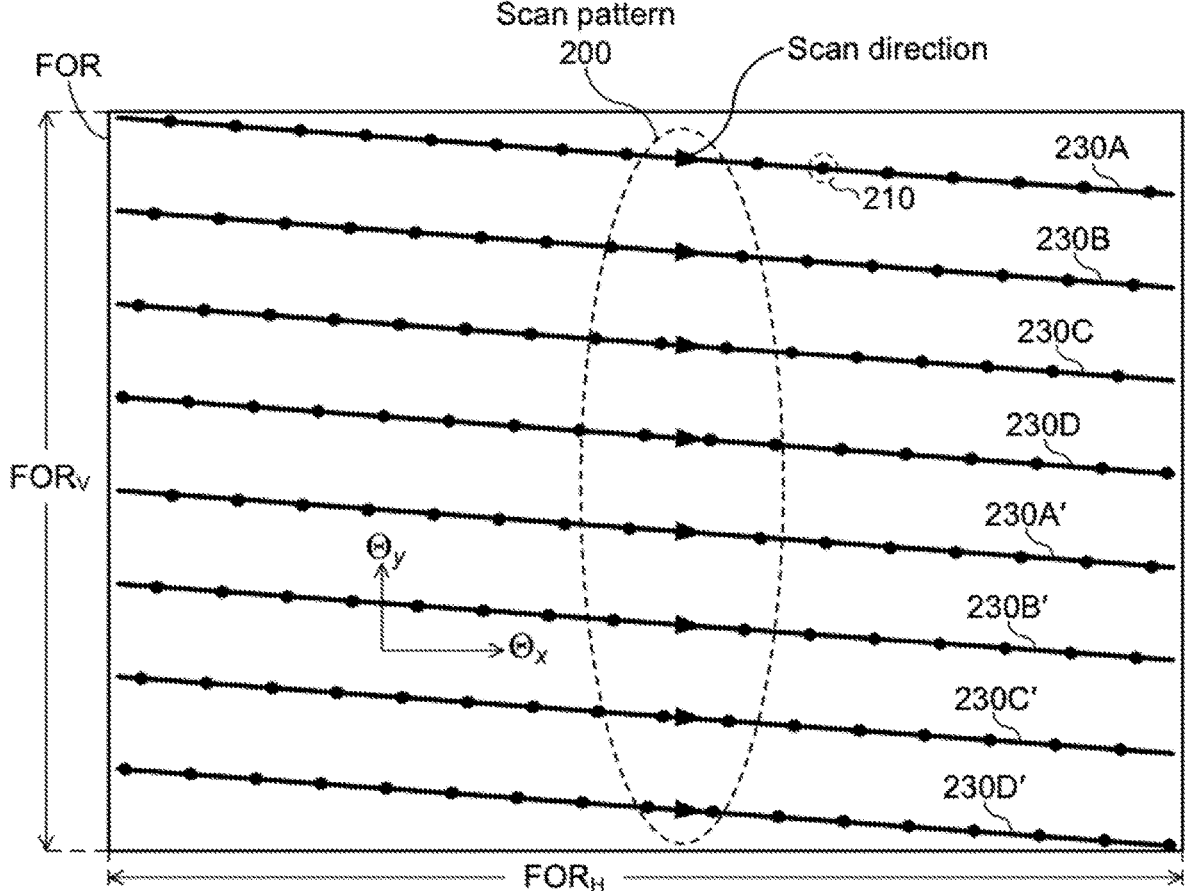
FIG. 5 illustrates an example unidirectional scan pattern that includes multiple pixels and multiple scan lines.

FIG. 5 illustrates an example unidirectional scan pattern 200 that includes multiple pixels 210 and multiple scan lines 230. In particular embodiments, scan pattern 200 may include any suitable number of scan lines 230 (e.g., approximately 1, 2, 5, 10, 20, 50, 100, 500, or 1,000 scan lines), and each scan line 230 of a scan pattern 200 may include any suitable number of pixels 210 (e.g., 1, 2, 5, 10, 20, 50, 100, 200, 500, 1,000, 2,000, or 5,000 pixels). The scan pattern 200 illustrated in FIG. 5 includes eight scan lines 230, and each scan line 230 includes approximately 16 pixels 210. In particular embodiments, a scan pattern 200 where the scan lines 230 are scanned in two directions (e.g., alternately scanning from right to left and then from left to right) may be referred to as a bidirectional scan pattern 200, and a scan pattern 200 where the scan lines 230 are scanned in the same direction may be referred to as a unidirectional scan pattern 200. The scan pattern 200 in FIG. 2 may be referred to as a bidirectional scan pattern, and the scan pattern 200 in FIG. 5 may be referred to as a unidirectional scan pattern 200 where each scan line 230 travels across the FOR in substantially the same direction (e.g., approximately from left to right as viewed from the lidar system 100). In particular embodiments, scan lines 230 of a unidirectional scan pattern 200 may be directed across a FOR in any suitable direction, such as for example, from left to right, from right to left, from top to bottom, from bottom to top, or at any suitable angle (e.g., at a 0°, 5°, 10°, 30°, or 45° angle) with respect to a horizontal or vertical axis. In particular embodiments, each scan line 230 in a unidirectional scan pattern 200 may be a separate line that is not directly connected to a previous or subsequent scan line 230.

In particular embodiments, a unidirectional scan pattern 200 may be produced by a scanner 120 that includes a polygon mirror (e.g., polygon mirror 301 of FIG. 3), where each scan line 230 is associated with a particular reflective surface 320 of the polygon mirror. As an example, reflective surface 320A of polygon mirror 301 in FIG. 3 may produce scan line 230A in FIG. 5. Similarly, as the polygon mirror 301 rotates, reflective surfaces 320B, 320C, and 320D may successively produce scan lines 230B, 230C, and 230D, respectively. Additionally, for a subsequent revolution of the polygon mirror 301, the scan lines 230A', 230B', 230C', and 230D' may be successively produced by reflections of the output beam 125 from reflective surfaces 320A, 320B, 320C, and 320D, respectively. In particular embodiments, N successive scan lines 230 of a unidirectional scan pattern 200 may correspond to one full revolution of an N-sided polygon mirror. As an example, the four scan lines 230A, 230B, 230C, and 230D in FIG. 5 may correspond to one full revolution of the four-sided polygon mirror 301 in FIG. 3. Additionally, a subsequent revolution of the polygon mirror 301 may produce the next four scan lines 230A', 230B', 230C', and 230D' in FIG. 5.

Figure 6:
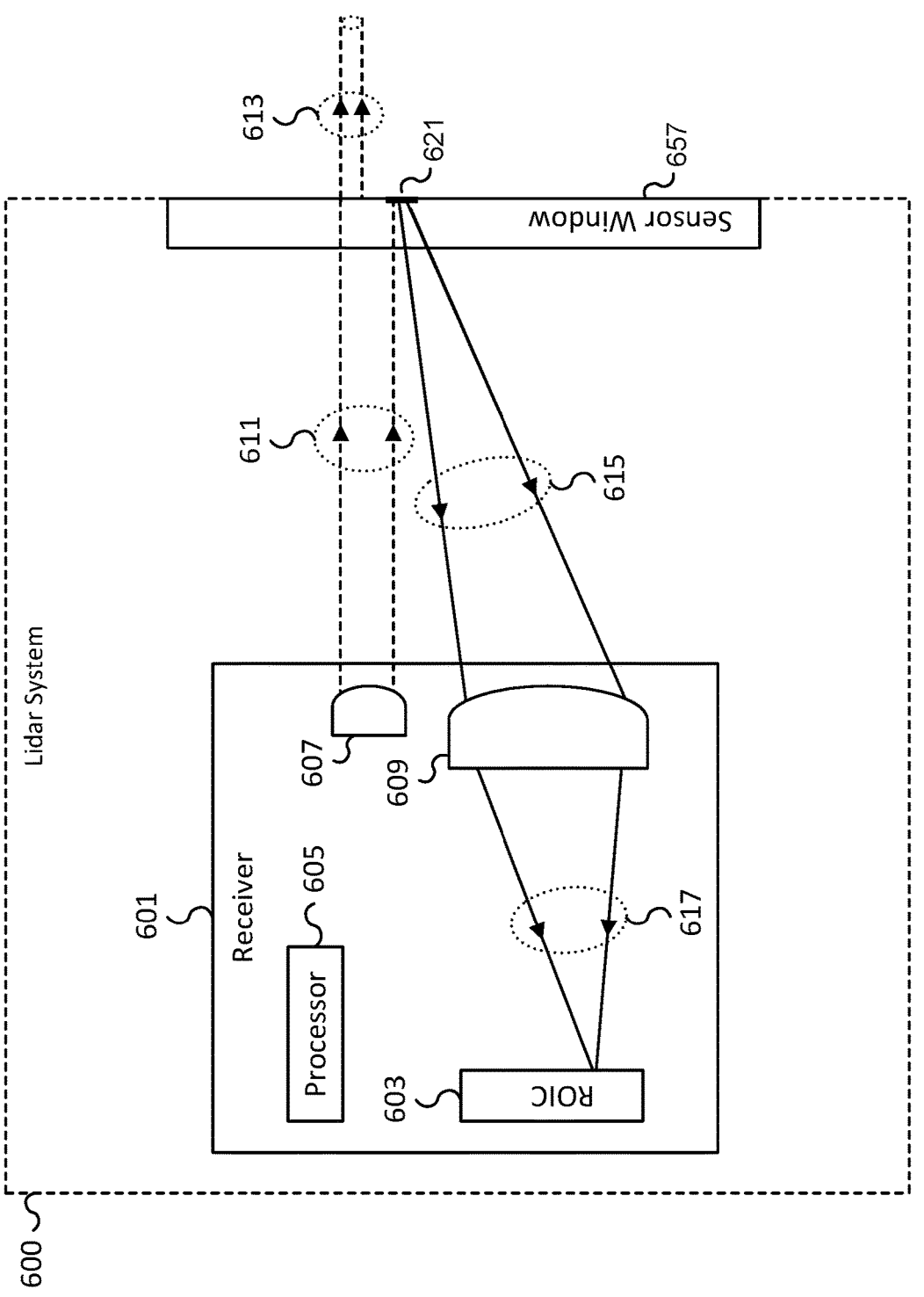
FIG. 6 illustrates an embodiment of a lidar system capable of detecting objects through a sensor window.

FIG. 6 illustrates an embodiment of a lidar system capable of detecting objects through a sensor window. In the example shown, lidar system 600 includes at least receiver 601 and sensor window 657. In some embodiments, lidar system 600 is lidar system 100 of FIG. 1. In order to focus on the functionality of receiver 601, additional components of lidar system 600, such as a light source, mirrors, a scanner, and a controller are not shown. In the example of FIG. 6, receiver 601 includes readout integrated circuit (ROIC) 603, processor 605, transmit lens 607, and receive lens 609. Transmit lens 607 collimates output beam 611 in order to scan a field of regard. As shown in the example, reflective component 621 resides on sensor window 657 of lidar system 600 and at least partially blocks output beam 611, splitting output beam 611 into scattered light and partial output beam 613. At least a portion of the scattered light is represented as input beam 615 and focused input beam 617. In various embodiments, receiver 601 is receiver 140 of FIG. 1 and sensor window 657 is sensor window 157 of FIG. 1. In some embodiments, output beam 611 and partial output beam 613 are associated with output beam 125 of FIG. 1.

In some embodiments, lidar system 600 emits output beam 611 that is collimated by transmit lens 607. Output beam 611 at least partially passes through sensor window 657. In various embodiments, sensor window 657 is a window used to protect the internal components of lidar system 600. For example, sensor window 657 can act as a shield to protect the internal components of lidar system 600 from environmental elements such as road debris and weather while still allowing lidar system 600 to emit output beam 611 and to detect light scattered by downrange objects. In various embodiments, at sensor window 657, output beam 611 is at least partially split by reflective component 621. Partial output beam 613 is the portion of output beam 611 that is not blocked by reflective component 621 and can reach a downrange object (not shown). For simplicity, FIG. 6 does not show the corresponding input beam detected by lidar system 600 and used by receiver 601 to detect a downrange object when partial output beam 613 reaches the downrange object.

The example shown is illustrative and not restrictive. Reflective component 621 can be of various sizes, ranging from small dots to large zones. Reflective component 621 can also be located in various positions within sensor window 657. For example, reflective component 621 may be comprised of a film of relatively high reflectivity (e.g., 1% to 5% reflectivity) material, and the film may be attached to the other side of sensor window 657 that is closer to receiver 601. Alternatively, it is possible to attach the film to the side of sensor window 657 that is closer to objects downrange of lidar system 600. Reflective component 621 may be comprised of various types of materials. Examples of materials that may be utilized include aluminum, stainless steel, polyimide, and other polymers. In some embodiments, reflective component 621 is a reflective marker that is embedded within sensor window 657. For example, the reflective marker can be formed using a deposition process during the fabrication of sensor window 657. As shown in FIG. 6, reflective component 621 scatters at least a portion of output beam 611. A portion of the scattered light passes (at least partially) back to lidar system 600 as input beam 615 towards receiver 601. At receiver 601, input beam 615 is focused by receive lens 609 to direct focused input beam 617 at readout integrated circuit (ROIC) 603. In some embodiments, the fronts of transmit lens 607 and receive lens 609 are aligned and the distance from the front of transmit lens 607 and the front of receive lens 609 to the front of sensor window 657 is the same.

In various embodiments, ROIC 603 contains one or more detectors (not shown) for detecting scattered light including scattered light from downrange objects (not shown) as well as scattered light from reflective component 621. At ROIC 603, one or more detectors (not shown) detect focused input beam 617. In the event focused input beam 617 is detected at ROIC 603, ROIC 603 outputs a corresponding sensor reading. The sensor reading can be an electronic signal corresponding to a measurement of the detected scattered light of focused input beam 617. In some embodiments, processor 605 is communicatively connected to ROIC 603 and analyzes the output of ROIC 603. In some embodiments, processor 605 outputs a determination of whether a reflected signal is detected. In various embodiments, the different measurements made by lidar system 600 (e.g., of downrange objects as well as reflected signals from reflective component 621) can be used to configure the position of the different lenses, the distance of the sensor window from the lenses, the properties of the lenses, and the position of ROIC 603 and its associated detectors. The accurate positioning of the various components of lidar system 600, including the location of detector sites of ROIC 603, is critical in order to accurately detect both downrange objects and signals reflected from reflective component 621.

Figure 7:
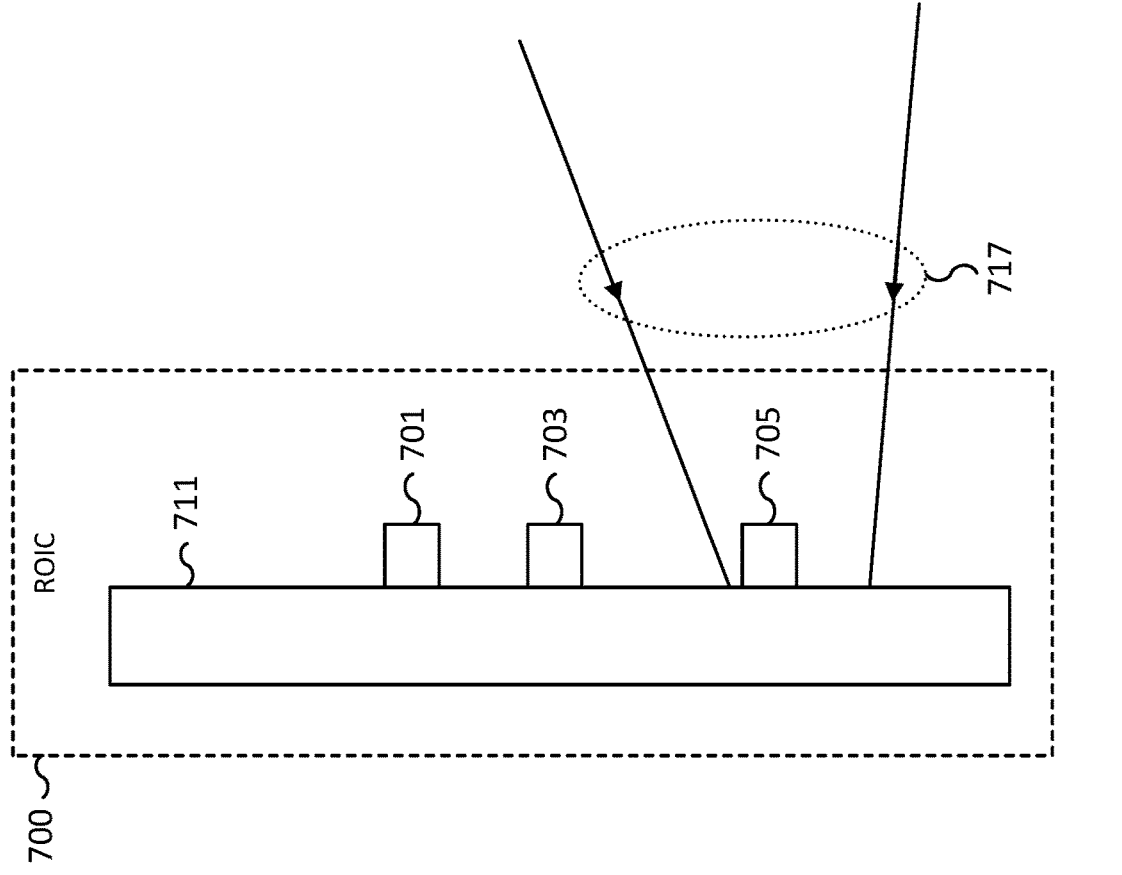
FIG. 7 illustrates an embodiment of a readout integrated circuit (ROIC) component of a lidar system.

FIG. 7 illustrates an embodiment of a readout integrated circuit (ROIC) component of a lidar system. In the example shown, readout integrated circuit (ROIC) 700 of a lidar system includes at least the main body component 711 of ROIC 700 and detector site locations 701, 703, and 705. Detector site location 705 is located within the beam pattern of focused input beam 717, which corresponds to at least a portion of the light scattered from a reflective component of the sensor window of the lidar system. In the example shown, detector site locations 701 and 703 are primary detector site locations for detecting downrange objects and detector site location 705 is a reflective component detector site location for detecting reflected signals from reflective components of the sensor window of the lidar system. Detector site location 705 may include a detector that is coupled, mounted, or attached to ROIC 700, or detector site location 705 may include a detector that is fabricated or integrated into ROIC 700. For example, detector site location 705 may include a separate silicon or InGaAs detector that is soldered, epoxied, or electrically attached to ROIC 700. As another example, detector site location 705 may include a silicon, germanium, or silicon-germanium detector that is integrated into or fabricated along with ROIC 700. In some embodiments, ROIC 700 is ROIC 603 of FIG. 6, and/or focused input beam 717 is focused input beam 617 of FIG. 6. In some embodiments, focused input beam 717 corresponds to light scattered from reflective component 621 of FIG. 6 that is associated with sensor window 657 of FIG. 6.

In some embodiments, detector site locations 701, 703, and 705 are positioned to each detect different scatter patterns. In the example shown, ROIC 700 includes two primary detector site locations, detector site locations 701 and 703. In some embodiments, one, two, or more primary detector site locations are utilized to detect different scatter patterns and the different scatter patterns can correspond to one, two, or more different output beams. For example, two primary detector site locations can be utilized by the lidar system to detect scatter patterns associated with two different output beams and their corresponding input beams. In some embodiments, multiple different output beams can be split from a single original beam. In various embodiments, detector site location 705 is a reflective component detector site location and a reflective component detector is specifically located at detector site location 705 to detect scatter patterns associated with reflective components in and/or on the sensor window. As shown in FIG. 7, detector site location 705 is located within the beam pattern of focused input beam 717 and allows ROIC 700 to detect reflected signals from the sensor window.

In some embodiments, main body component 711 of ROIC 700 is the main component of a readout integrated circuit. In some embodiments, ROIC 700 is an application-specific integrated circuit (ASIC) with light detectors. For example, main body component 711 can be an ASIC designed for reading/processing signals from light detectors positioned at detector site locations 701, 703, and 705. The actual light detectors can be coupled and/or mounted directly to the ASIC and may have an output that is electrically connected to the input of the ASIC. In various embodiments, ROIC 700, including main body component 711, captures sensor data from associated light detectors and can output corresponding output signals such as readout values that can be used to analyze the captured sensor data results. In some embodiments, ROIC 700 outputs a signal that can be analyzed by a processor such as processor 605 of FIG. 6. In some embodiments, ROIC 700 performs functionality such as current-to-voltage conversion, voltage amplification, filtering, edge/level detection, timing, time-to-digital conversion, and/or reflected signal detection such as one or more steps of a process for detecting and reporting reflected signals from the sensor window.

In the example shown, ROIC 700 includes only a single reflected component detector site location (i.e., detector site location 705). In some embodiments, ROIC 700 can include multiple reflected component detector site locations (not shown) such as different reflected component detector site locations to capture different scatter patterns from different output beams and their corresponding input beams. For example, the location of each reflected component detector site location can be optimized to detect scatter patterns associated with one or more different input beams. As another example, in some embodiments, a lidar system utilizes two different output beams with two different primary detector site locations for detecting downrange objects and two different reflected component detector site locations to differentiate the scatter patterns of reflected signals that are generated by the two different output beams.

In some embodiments, a single reflected component detector site location is utilized for multiple output beams. For example, scatter patterns associated with two different output beams can be detected at a single reflected component detector site location. In the event only a single reflected component detector site location is utilized for multiple output beams, the single reflected component detector site location is located where the scatter patterns of the different output beams overlap. In contrast, when multiple reflected component detector site locations are utilized, the different reflected component detector site locations can be positioned outside of where the scatter patterns of the different output beams overlap. Each reflected component detector site location is configured to only detect scatter patterns associated with their associated output beam(s).

Figure 8:
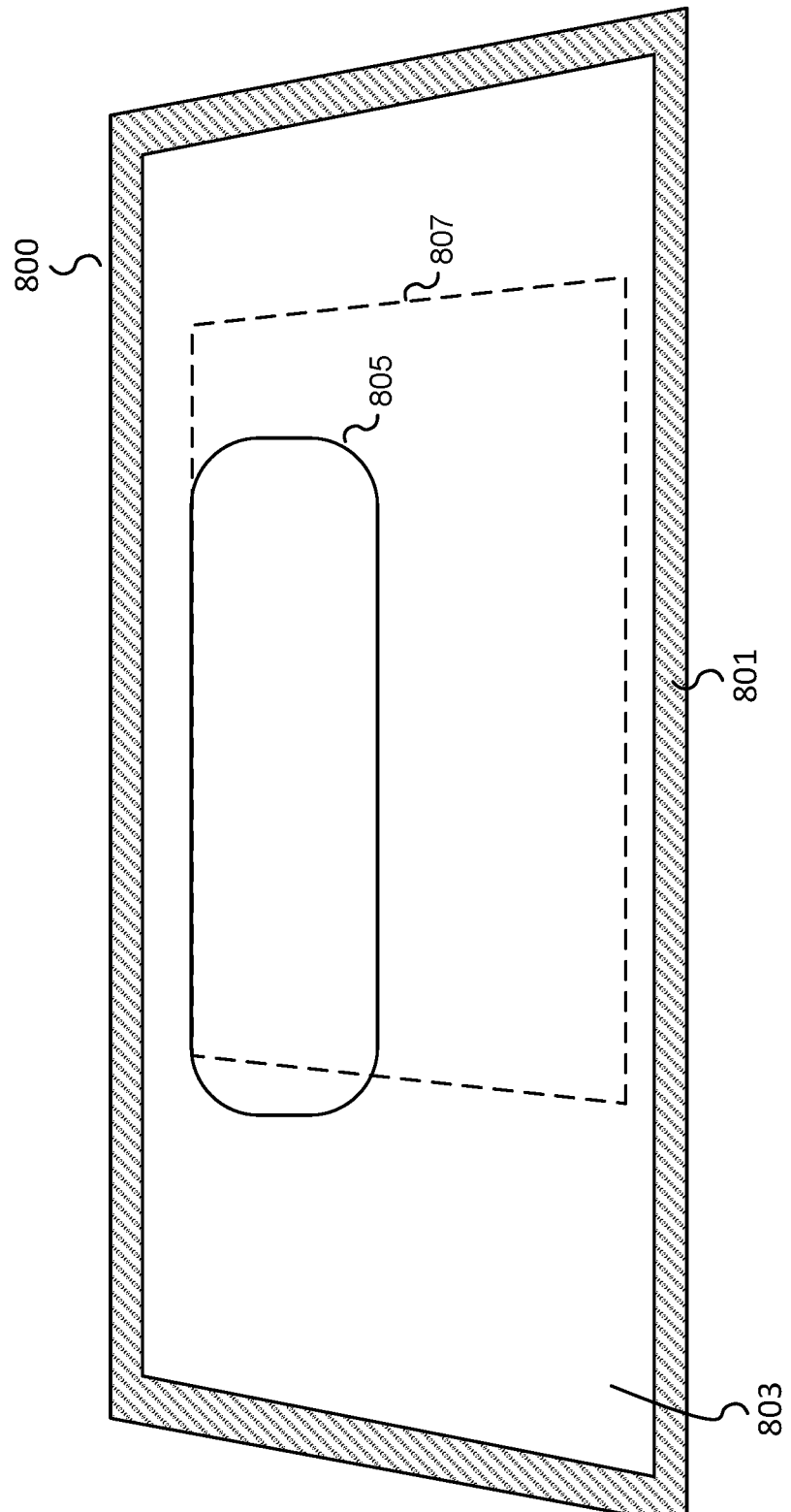
FIG. 8 illustrates a sensor window with example transmit and receive regions.

FIG. 8 illustrates a sensor window with example transmit and receive regions. In the example shown, sensor window 800 includes housing 801 and transparent material 803. Housing 801 comprises a rigid casing (e.g., including metal, plastic, or another solid material) for transparent material 803. Housing 801 is securely attached to transparent material in order to prevent movement of transparent material 803. Examples of materials that can comprise transparent material 803 are laminated glass, acrylic, and other glass or plastic materials. Transparent material 803 has a specified thickness. In some embodiments, housing 801 attaches to a frame of a vehicle that utilizes a lidar system to emit and receive light through sensor window 800. In some embodiments, sensor window 800 is sensor window 157 of FIG. 1, sensor window 157 of FIG. 3, and/or sensor window 657 of FIG. 6. In the example shown, transmit aperture 805 is a region of sensor window 800 that emitted light from a particular light source typically scans. In some embodiments, transmit aperture 805 corresponds to a single "eye" (e.g., a single scanner) of a lidar system scanning an output beam to cover a particular FOR. As described in further detail herein, a lidar system may include multiple "eyes" configured to scan multiple output beams across different regions of a sensor window. In the example shown, receive aperture 807 corresponds to transmit aperture 805. Stated alternatively, transmit aperture 805 and receive aperture 807 form a transmit and receive pair. Emitted light that passes through transmit aperture 805, scatters off of a downrange object, and passes back through sensor window 800 can be detected if it passes through receive aperture 807. In a system with different transmit apertures corresponding to different "eyes", the different transmit apertures will be associated with different receive apertures that typically overlap at least in part.

Figure 9:
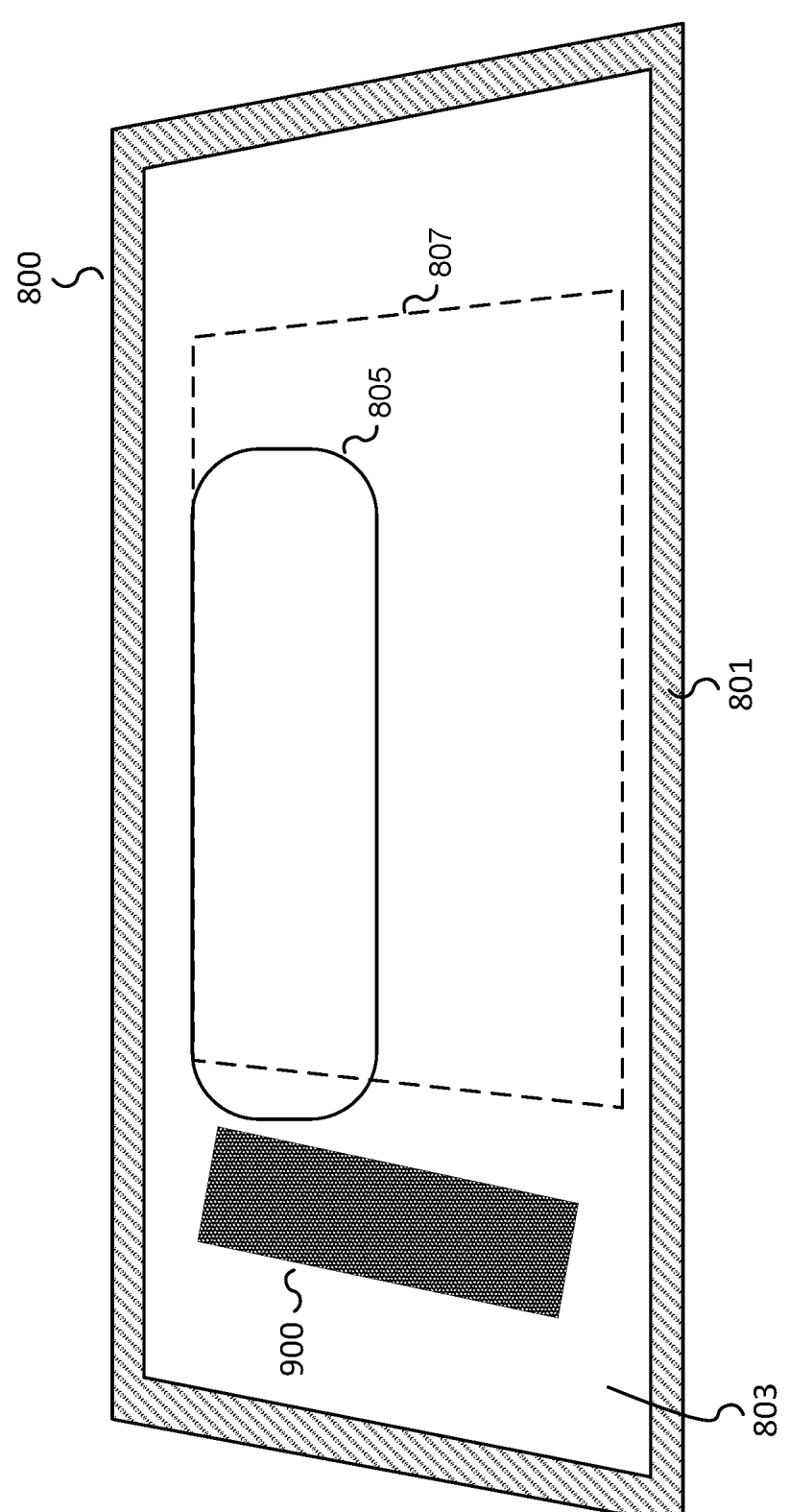
FIG. 9 illustrates a sensor window with an example placement of a reflective material region.

FIG. 9 illustrates a sensor window with an example placement of a reflective material region. In the example shown, reflective material 900 is added to sensor window 800. In some embodiments, reflective material 900 is a film that is adhered to the inside of sensor window 800. For example, an aluminum, stainless steel, polyimide, or other polymer film may be attached to a glass transparent material 803. It is also possible to attach reflective material 900 to the other side of sensor window 800 or deposit it within sensor window 800 (e.g., deposited within transparent material 803). Reflective material 900 has much higher reflectivity than transparent material 803. For example, reflective material 900 may have a reflectivity between 1% to 5%, which is much higher than the almost 0% reflectivity that transparent material 803 is typically configured to have. In many scenarios, reflective material 900 comprises a material that does not degrade from repeated exposure to light and absorbs most of the light that it does not reflect, giving it a darker appearance than transparent material 803.

In various embodiments, reflective material is utilized for calibration of pulse energy (output power) of an output beam of a lidar system. Calibration of pulse energy is necessary in many scenarios because component-level variation with temperature and time can lead to pulse energy drift from a light source (e.g., light source 110). Multiple components in the light source can cause the output power to vary with temperature. In some scenarios, the variation is not monotonic with temperature, creating a challenge for compensation. In addition, compensation requires prior knowledge of how an output beam will behave as a function of temperature, and does not guarantee that the output beam will be stable with time. Hence, an active measurement of the output power (also referred to as pulse energy) with a detector that has low variation with respect to sensor case temperature is desirable. In various embodiments, detectors on a ROIC (e.g., ROIC 603 and/or ROIC 700) are placed such that they are illuminated by back-scatter from sensor window 800. In various embodiments, these detectors receive back-scattered light from a fixed-reflectivity object placed outside the field of regard of the light source to allow a once-per-line measurement of the pulse energy. In the example shown, reflective material 900 comprises this fixed-reflectivity object and is located adjacent to and not overlapping with transmit aperture 805 and receive aperture 807.

In various embodiments, the ROIC is temperature stabilized, yielding a lower drift with respect to ambient temperature than detectors placed elsewhere in the lidar system. A PIN photodiode on the ROIC can be used. A PIN photodiode has unity gain and low temperature dependence. In the example shown, back scatter from reflectivity material 900 can be detected by PIN photodiodes on a ROIC, and an integrated energy monitor on the ROIC can record the pulse energy returning from reflectivity material 900 for each output beam. In some embodiments, the pulse energy measurement is averaged over many scan lines (e.g., 100+ lines per second), providing a low noise measure of the average pulse energy. The resulting average pulse energy measurement can be used to normalize the returned pulse energy from returns from downrange objects measured by the lidar system.

Figure 10:
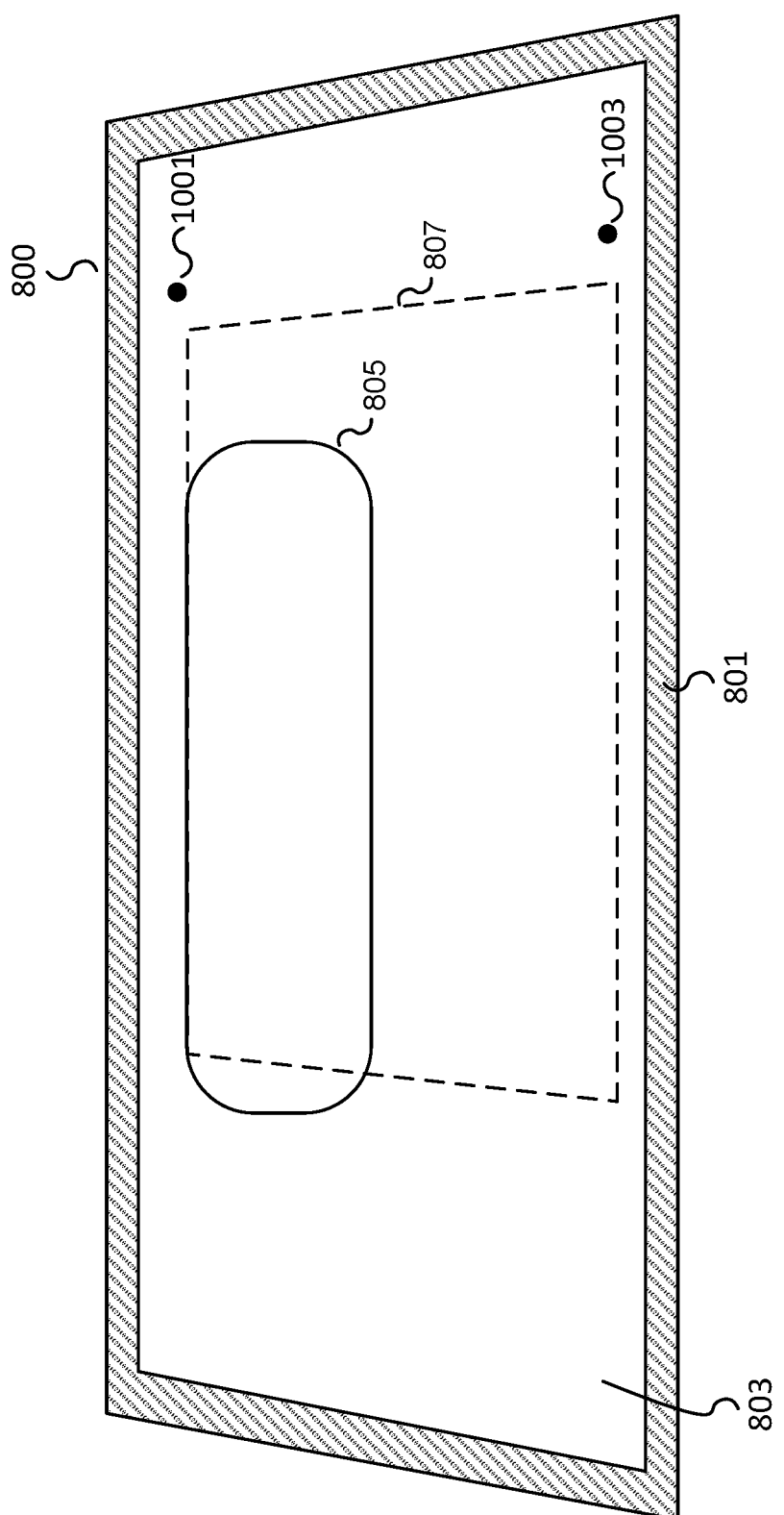
FIG. 10 illustrates a sensor window with an example placement of reflective markers.

FIG. 10 illustrates a sensor window with an example placement of reflective markers. In the example shown, reference location markers 1001 and 1003 are added to sensor window 800. In some embodiments, reference location markers 1001 and 1003 are deposited within transparent material 803. Reference location markers may utilize the same materials as reflective material 900 or different materials tailored for deposition within transparent material 803 (e.g., suitable for deposition within glass). In some embodiments, the physical implementation of adding reference location markers 1001 and 1003 (e.g., in the shape of dots, crosshairs, or other shapes) to sensor window 800 includes depositing reflective markings in bright white paint or metallic ink (e.g., silver, nickel, or another color) via silk screening, vacuum deposition, or another deposition technique known to those skilled in the art. Depositing markings within glass or another material has the advantage that they are not exposed to the wear and tear of weather temperature extremes and other elements such rain, snow, hail, dirt, debris, etc. Reference location markers 1001 and 1003 have higher reflectivity than transparent material 803. For example, reference location markers 1001 and 1003 may have a reflectivity between 1% to 5%, which is much higher than the almost 0% reflectivity that transparent material 803 is typically configured to have.

In the example shown, reference location markers 1001 and 1003 are shaped as dots (though other shapes, e.g., crosshairs, are also possible). Reference location markers 1001 and 1003 can be utilized to compensate for optical axis drift of an output beam (e.g., output beam 125). Drift of altitude (also referred to as elevation) and azimuth angles can occur. A persistent problem with sensitive opto-mechanical assemblies is drift of the optical axis with respect to mechanical datums. There are many causes for the optical elevation or azimuth drift, with the most common being expansion or contraction of components due to temperature changes. Thermal gradients from components heating up and/or ambient environmental temperature changes can cause dimensional instability of critical optical components. Even a minor change, on the order of microns, in mechanical tolerance associated with the components that align the optical beam, can cause the optical path to shift slightly. In addition, electrical circuits associated with motor control and servo function can experience drift over time and with temperature. The end result is that a lidar point cloud is shifted, giving rise to an erroneous 3D map (e.g., a 0.1-degree shift in the optical path would cause an object at 200 m to be incorrectly detected by 0.35 m).

In various embodiments, reflective (e.g., dot) markings (e.g., reference location markers 1001 and 1003) in sensor window 800 are utilized close to a scanned field of regard so that a transmit beam is bounced back as a signal to the receiver to record their locations. In various embodiments, reference location markers 1001 and 1003 are located outside the field of regard but within the accessible scan region of a lidar system (e.g., at one or more corners of a scan). In this manner, during normal operation and outside of a calibration scenario, the reference location markers are not scanned. It is also possible (though, not shown in FIG. 10) to have intermediate markings between the extremes of the field of regard to assess scan linearity. The ability to record the location of reference location markers 1001 and 1003 in a controlled environment at final assembly provides a baseline that can be used to detect and correct drift variation from the original calibration. In various embodiments, optical axis drift is analyzed over the course of minutes, hours, or days (e.g., averaging the drift detected) to detect long-term drift.

Figure 11:
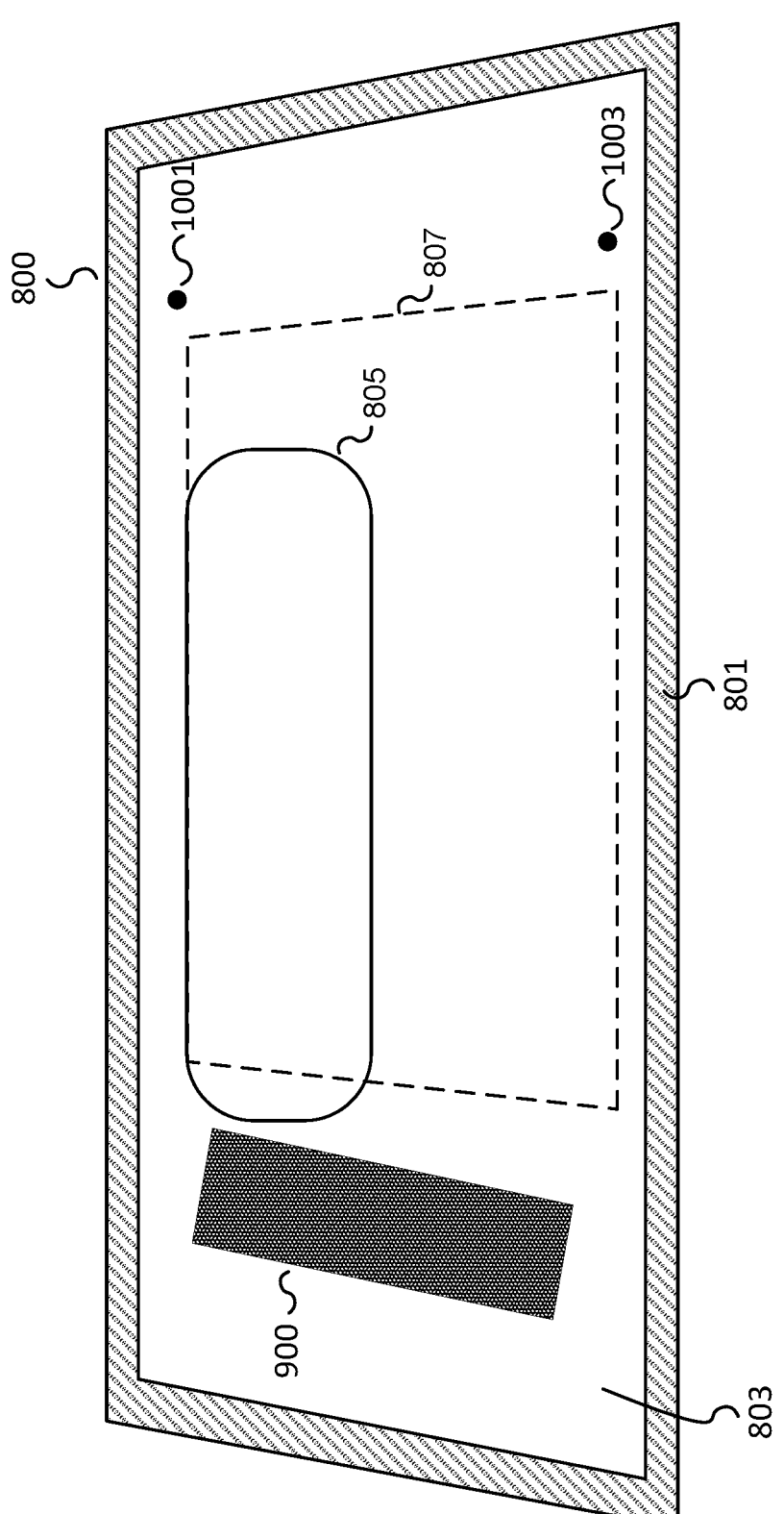
FIG. 11 illustrates a sensor window with example placements of both a reflective material region and reflective markers.

FIG. 11 illustrates a sensor window with example placements of both a reflective material region and reflective markers. In the example shown, reflective material 900 as well as reference location markers 1001 and 1003 are both included in sensor window 800. In the embodiment illustrated, it would be possible to perform both pulse energy calibration (using reflective material 900) and optical axis drift calibration (using reference location markers 1001 and 1003). It is also possible to attempt to utilize one type of reflective object in sensor window 800 to perform both types of calibration. However, it would be difficult because reflective material 900 would be difficult to localize for optical axis drift calibration due to its larger size, and reference location markers 1001 and 1003 may be too small for power calibration because an output beam could be larger than the location markers, meaning it is possible that not enough reflected signal is collected.

Figure 12:
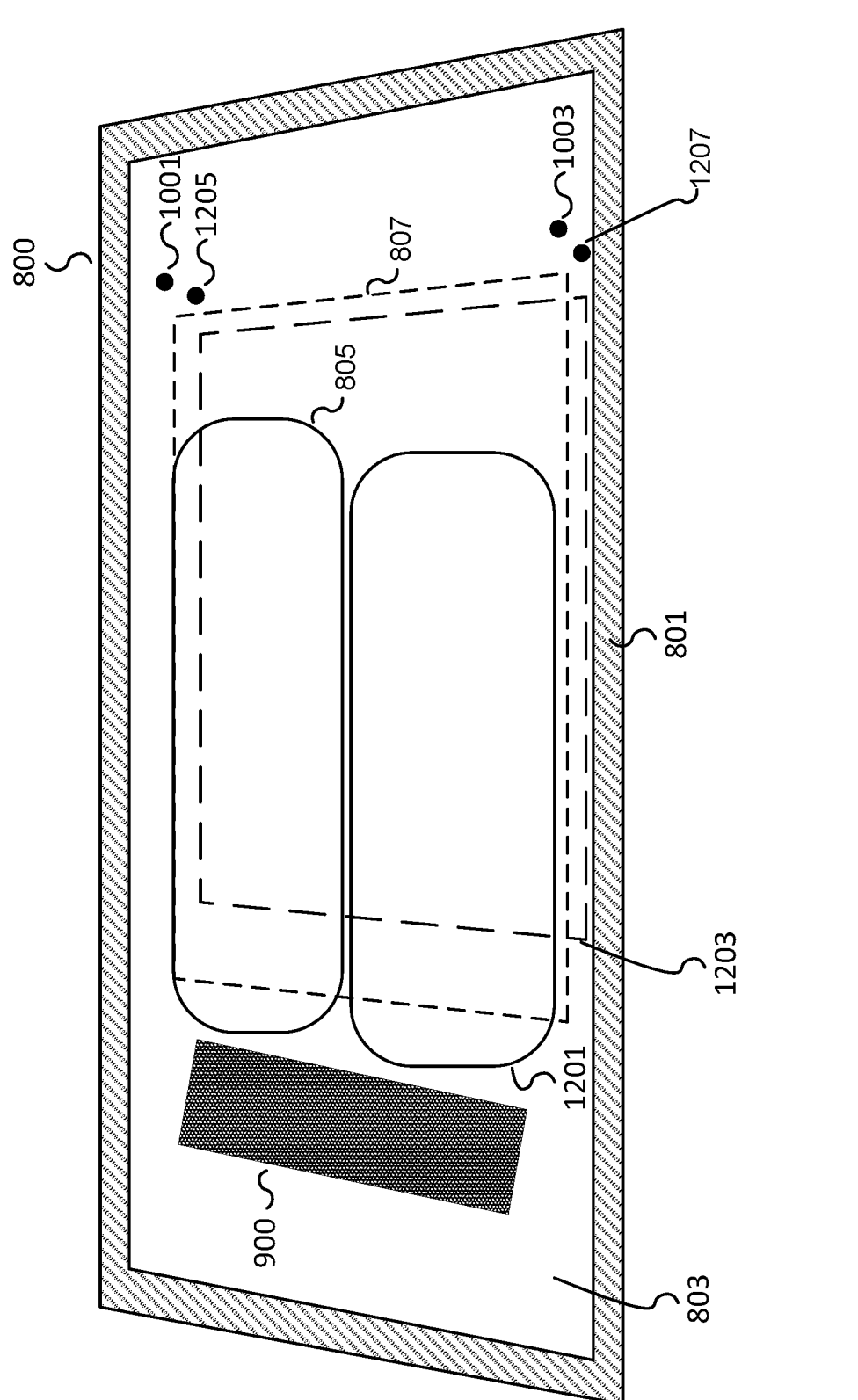
FIG. 12 illustrates a sensor window with multiple transmit and receive regions.

FIG. 12 illustrates a sensor window with multiple transmit and receive regions. In the example shown, sensor window 800 further includes reference location markers 1205 and 1207. In some embodiments, reference location markers 1205 and 1207 have the same composition as reference location markers 1001 and 1003. Reference location markers 1205 and 1207 are utilized to perform optical axis drift calibration associated with a different output beam than that associated with reference location markers 1001 and 1003. Stated alternatively, in a lidar system with multiple "eyes" configured to scan multiple output beams, each of which has its own field of regard, multiple sets of reference location markers can be utilized. In the example shown, reference location markers 1001 and 1003 correspond to a first output beam sent through transmit aperture 805 and reflected back through receive aperture 807, and reference location markers 1205 and 1207 correspond to a second output beam sent through transmit aperture 1201 and reflected back through receive aperture 1203.

Figure 13:
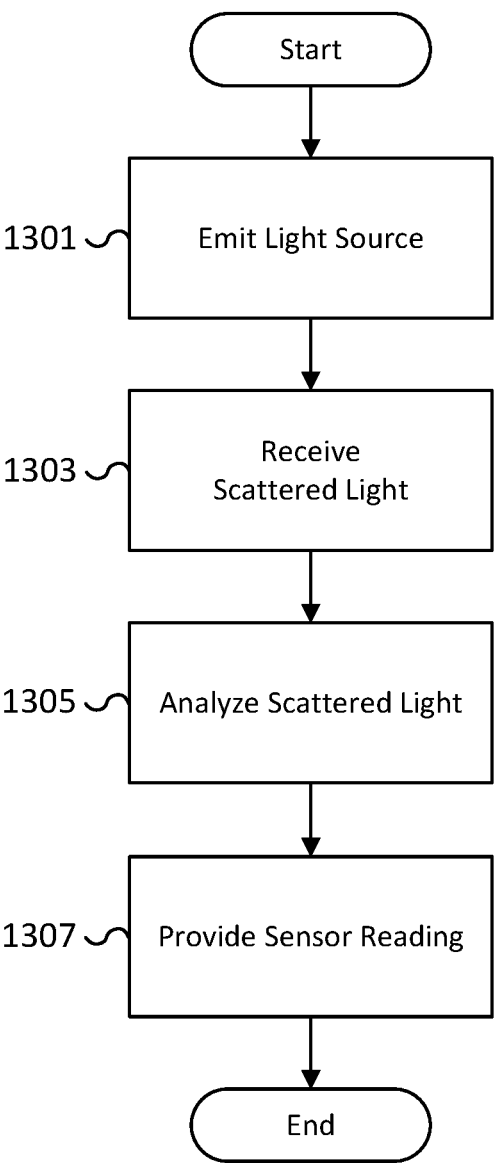
FIG. 13 is a flow chart illustrating an embodiment of a process of a lidar system for detecting objects.

FIG. 13 is a flow chart illustrating an embodiment of a process of a lidar system for detecting objects. Using the process of FIG. 13, a lidar system can detect objects including downrange objects or reflective objects on and/or in a sensor window of the lidar system. For example, a vehicle equipped with the disclosed lidar system can detect other vehicles, pedestrians, lane markers, and street signs, etc. that are downrange from the vehicle as well as reflective material 900 and/or reference location markers 1001, 1003, 1205, and 1207. Depending on the orientation and number of lidar systems installed on the vehicle, different fields of regard can be scanned to determine the corresponding environment surrounding the vehicle. Vehicle safety features as well as autonomous driving features can be implemented using the captured environmental data. In various embodiments, using the process of FIG. 13 with the disclosed lidar system, a single process can be performed for detecting downrange objects as well as reflective objects for calibration purposes. For example, the lidar system can be configured with a sensor window to protect the internal components of the lidar system and from which emitted output beams pass through to reach downrange objects. When the emitted beam hits an object, at least a portion of the scattered and/or reflected light can be captured by the lidar system as an input beam. In some scenarios, output beam pulse energy and alignment can drift and impact the operation of the lidar system. Such drift can impact the ability of the lidar system to accurately detect downrange objects. As part of the process of FIG. 13, both downrange objects and reflective objects for drift compensation can be detected. In some embodiments, the lidar system performing the process of FIG. 13 is lidar system 100 of FIGS. 1-4 and/or lidar system 600 of FIG. 6. In some embodiments, the ROIC of the lidar system is ROIC 603 of FIG. 6 and/or ROIC 700 of FIG. 7.

At 1301, one or more beams of light are emitted. For example, an output light beam is emitted from the lidar system that passes through a sensor window. The sensor window can act as a protective barrier for the lidar system while still allowing light to pass in both directions. In some embodiments, the lidar system emits multiple output beams, each potentially scanning a different field of regard. The output beam can reach downrange objects and can be scattered and/or reflected by the downrange objects.

At 1303, scattered light is received. For example, light scattered and/or reflected by an object is received at the lidar sensor. The corresponding object can be a downrange object as well as reflective object on and/or in the sensor window. In some embodiments, the transmit and receive axes of the emitted light and received light are offset, for example, by a parallax distance configured for the lidar system.

At 1305, the received scattered light is analyzed. For example, the received scattered light is directed to a receiver component of the lidar system where sensor data can be captured and analyzed. In some embodiments, the receiver component includes a receive lens for focusing the received scattered light onto a readout integrated circuit (ROIC) of the receiver where detector site locations of the detector plane are located. The detector site locations can be used to detect scatter patterns associated with the received scattered light. In various embodiments, different detector site locations are utilized to detect light scattered from a downrange object compared to light scattered from a reflective object on and/or in the sensor window. In some embodiments, different detector site locations are utilized to differentiate light scattered from different emitted output beams. Using detectors positioned at the detector site locations, sensor data can be captured and analyzed for sensor readings. In some embodiments, the analysis is performed at least in part by the readout integrated circuit (ROIC) and/or processor of the receiver and/or a controller of the lidar system. The processing can include determining an output signal corresponding to the detected scatter pattern. In some embodiments, the output signal is a sensor reading that corresponds to a measurement of the detected scattered light, such as an intensity reading or another measured sensor reading.

At 1307, a sensor reading is provided. For example, one or more sensor readings are provided in response to the analysis of the received scattered light performed at 1305. The sensor reading can be an intensity reading and/or another measurement or measurements. In some embodiments, the sensor reading includes location and/or distance data. For example, sensor readings can correspond to a point cloud based on objects detected in the fields of regard scanned by the lidar system. In some embodiments, a sensor reading includes an output signal for identifying a reference location marker in the sensor window. The output signal can include a location such as a specific location on the sensor window to serve as an optical axis drift calibration reading. The output signal can include a relative intensity to serve as a pulse energy calibration reading.

Figure 14:
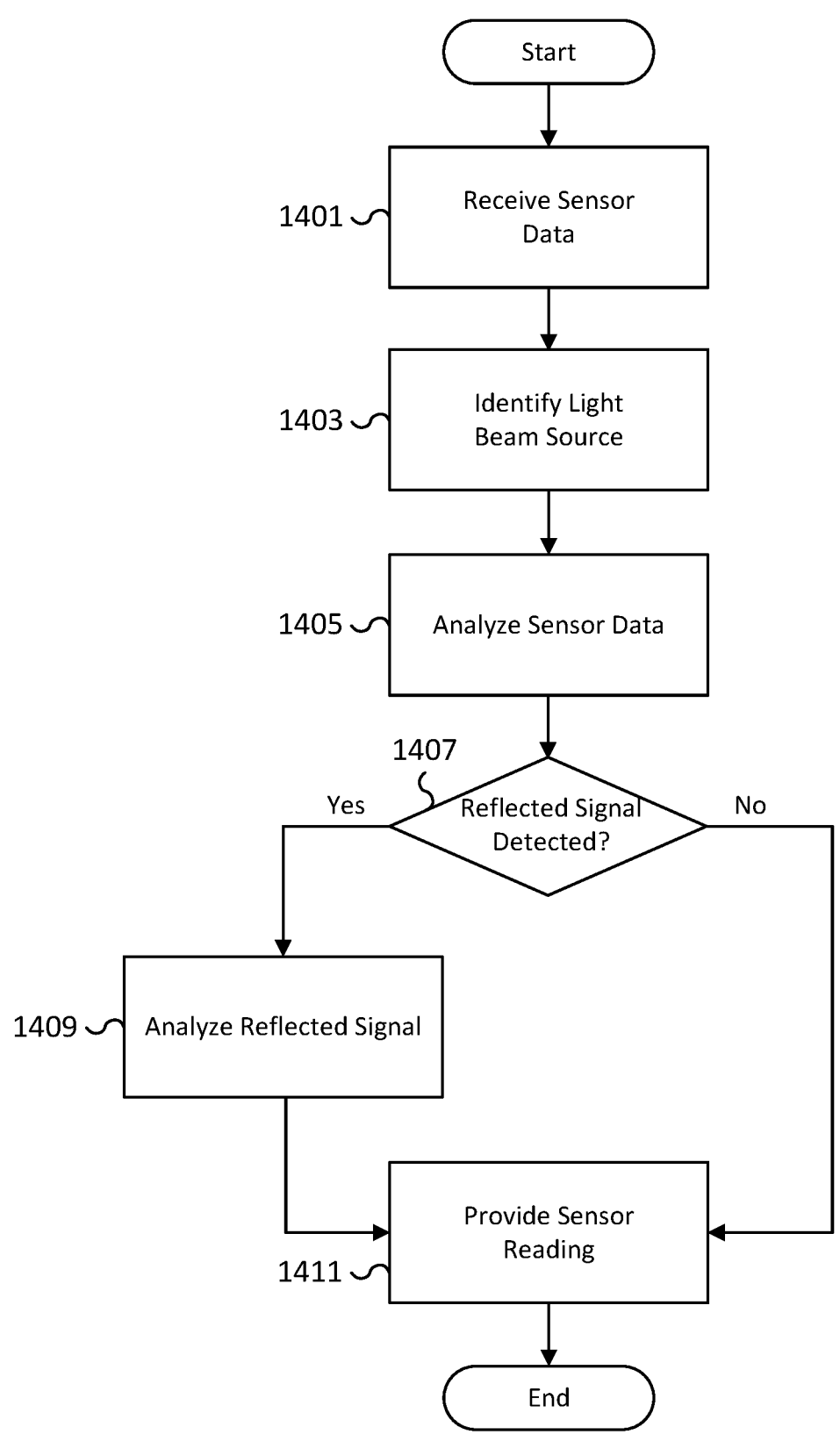
FIG. 14 is a flow chart illustrating an embodiment of a process for detecting a reflected signal from a sensor window.

FIG. 14 is a flow chart illustrating an embodiment of a process for detecting a reflected signal from a sensor window. Using the process of FIG. 14, a lidar system can detect and initiate a calibration response. In various embodiments, when an emitted output beam hits a reflective object on and/or in the sensor window, at least a portion of the light scattered and/or reflected by the reflective object can be captured by the lidar system as an input beam. By analyzing the light scattered and/or reflected by the reflective object, the lidar system can perform a calibration operation. In some embodiments, the lidar system performing the process of FIG. 14 is lidar system 100 of FIGS. 1-4 and/or lidar system 600 of FIG. 6. In some embodiments, the ROIC of the lidar system is ROIC 603 of FIG. 6 and/or ROIC 700 of FIG. 7. In some embodiments, the process of FIG. 14 is performed as part of performing the process of FIG. 13. For example, in some embodiments, step 1401 is performed at 1303 of FIG. 13, steps 1403, 1405, and/or 1407 are performed at 1305 of FIG. 13, and/or steps 1409 and/or 1411 are performed at 1307 of FIG. 13.

At 1401, sensor data is received. For example, light scattered and/or reflected by a reflective material 900 and/or reference location markers 1001, 1003, 1205, and/or 1207 is captured by the lidar system. The scattered and/or reflected light passes back into the lidar system through the same sensor window associated with the emitted output beam. In some embodiments, the receive path is offset from the transmit path based on a parallax distance and the received input beam is directed to a receiver of the lidar system. For example, one or more mirrors and/or lenses can be utilized to direct the input beam to sensor components of a lidar system receiver. In various embodiments, at the receiver component, detectors are positioned to capture and receive sensor data associated with at least a portion of the light scattered by reflective material 900 and/or reference location markers 1001, 1003, 1205, and/or 1207.

At 1403, a light source beam is identified. For example, the emitted output light beam that corresponds to the sensor data received at 1401 is identified. In some embodiments, the lidar system includes multiple emitted output beams. For example, a lidar system with multiple output beams can be configured such that each output beam can scan a different field of regard. This allows the multi-output beam lidar system to cover a larger field of regard in the same amount of time or the same field of regard in a shorter amount of time than a lidar system with a single or fewer output beam(s). In various embodiments, the output beam corresponding to the scatter pattern associated with the received sensor data is identified. In some embodiments, a single detector site location is used to detect the scatter patterns of multiple beams and additional analysis is performed at 1403 to differentiate which of the output beams is the source output beam. In some embodiments, the output beam is determined based on the particular detector site location that detects the scatter pattern. For example, different detector site locations can be positioned to detect scatter patterns associated with different output beams.

At 1405, sensor data is analyzed. For example, the sensor data received at 1401 is analyzed. In some embodiments, the analysis is performed at least in part by the readout integrated circuit (ROIC) and/or processor of the receiver and/or a controller of the lidar system. In some embodiments, the analysis is performed as described with respect to step 1305 of FIG. 13. The processing can include determining an output signal corresponding to the detected scatter pattern. For example, the sensor data can be analyzed based at least in part on the light beam source identified at 1403 to determine an output signal such as a sensor reading.

At 1407, a determination is made whether a reflected signal is detected. For example, the lidar system detects a reflective object on and/or in the sensor window. In the event such an object is detected, processing proceeds to 1409. Otherwise, processing proceeds to 1411.

At 1409, the reflected signal is analyzed. The analysis can correspond to an intensity calculation for pulse energy calibration or another computation. The analysis can include a location calculation of a reference location marker for optical axis drift calibration. In some embodiments, the appropriate response includes modification to the analysis of downrange objects detected by the lidar system. For example, the analysis process for detecting downrange objects and their properties (such as distance) can be adjusted to compensate for drift of pulse energy and/or optical axis.

At 1411, a sensor reading is provided. For example, one or more sensor readings are provided in response to the analysis performed at 1405 on the sensor data received at 1401. The sensor reading can be an intensity reading and/or another measurement or measurements. In some embodiments, a sensor reading includes an output signal for identifying that a reflective object on and/or in the sensor window has been detected. The output signal can include a location, such as a specific location of a reference location marker. In various embodiments, an output signal can reference the source of the emitted output beam.

In particular embodiments, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variations of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various embodiments have been described in connection with the accompanying drawings. However, it should be understood that the figures may not necessarily be drawn to scale. As an example, distances or angles depicted in the figures are illustrative and may not necessarily bear an exact relationship to actual dimensions or layouts of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, 11%, 12%, 13%, 14%, 15%, 110%, ±12%, or 115%. The term "substantially constant" refers to a value that varies by less than a particular amount over any suitable time interval. For example, a value that is substantially constant may vary by less than or equal to 20%, 10%, 1%, 0.5%, or 0.1% over a time interval of approximately $10^4$ s, $10^3$ s, $10^2$ s, 10 s, 1 s, 100 ms, 10 ms, 1 ms, 100 μs, 10 μs, or 1 μs. The term "substantially constant" may be applied to any suitable value, such as for example, an optical power, a pulse repetition frequency, an electrical current, a wavelength, an optical or electrical frequency, or an optical or electrical phase.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a light source configured to emit light;

a scanner configured to scan the emitted light across at least a portion of a reachable region including a field of regard through a window;

a reference reflectivity material included internally within a housing of the system and located in the reachable region but outside the field of regard;

a reference location marker included internally within the housing of the system and located in the reachable region but outside the field of regard;

a detector configured to detect at least a first portion of the emitted light scattered by the reference reflectivity material and to detect at least a second portion of the emitted light scattered by the reference location marker; and a processor configured to analyze detected information from the detector to determine an optical property of the emitted light and to determine a variation associated with a detected location of the reference location marker.

2. The system of claim 1, wherein the window comprises a transparent material.

3. The system of claim 2, wherein the transparent material comprises glass or plastic.

4. The system of claim 1, wherein the reference reflectivity material has a reflectivity in a range from one percent to five percent.

5. The system of claim 1, wherein the reference reflectivity material comprises a film that is affixed to the window.

6. The system of claim 1, wherein the reference reflectivity material comprises aluminum, stainless steel, or polyimide.

7. The system of claim 1, wherein the optical property comprises: a pulse energy, a peak power, an average power, a peak intensity, or an average intensity of the emitted light.

8. The system of claim 1, wherein the detector, a transmit lens, a receive lens, and a readout integrated circuit (ROIC) are included in a receiver component of the system, and wherein the detector is coupled to the readout integrated circuit (ROIC).

9. The system of claim 8, wherein the receiver component further includes another detector for downrange objects, and wherein the another detector for downrange objects is also coupled to the readout integrated circuit (ROIC).

10. A method, comprising:

emitting light from a light source;

scanning the emitted light across at least a portion of a reachable region including a field of regard through a window in a housing, wherein a reference location marker is included internally within the housing and located in the reachable region but outside the field of regard;

using a detector to detect at least a portion of the emitted light scattered by the reference location marker; and using a processor to analyze detected information from the detector to determine a variation associated with a detected location of the reference location marker.

11. A system, comprising:

a light source configured to emit light;

a scanner configured to scan the emitted light across at least a portion of a reachable region including a field of regard through a window;

a reference location marker included internally within a housing of the system and located in the reachable region but outside the field of regard;

a detector configured to detect at least a portion of the emitted light scattered by the reference location marker; and a processor configured to analyze detected information from the detector to determine a variation associated with a detected location of the reference location marker.

12. The system of claim 11, wherein the window comprises a transparent material.

13. The system of claim 12, wherein the transparent material comprises glass or plastic.

14. The system of claim 11, wherein the reference location marker has a reflectivity in a range from one percent to five percent.

15. The system of claim 11, wherein the reference location marker is incorporated into the window via a deposition technique.

16. The system of claim 11, wherein the reference location marker comprises a paint or an ink.

17. The system of claim 11, wherein the variation associated with the detected location of the reference location marker is associated with optical axis drift of the light source.

18. The system of claim 11, further comprising a reference reflectivity material different from the reference location marker that is also included internally within the housing of the system and located in the reachable region but outside the field of regard.

19. The system of claim 18, wherein the detector is further configured to detect at least a portion of light scattered by the reference reflectivity material.

20. The system of claim 19, wherein the processor is further configured to analyze detected information associated with the at least the portion of light scattered by the reference reflectivity material to determine an optical property of the light source.

* * * * *